United States Patent
Oshima

(10) Patent No.: US 10,780,347 B2
(45) Date of Patent: Sep. 22, 2020

(54) PRINT SYSTEM, SERVER, PRINT METHOD, AND PROGRAM

(71) Applicant: FUJIFILM Corporation, Tokyo (JP)

(72) Inventor: Hiroyuki Oshima, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/389,845

(22) Filed: Apr. 19, 2019

(65) Prior Publication Data
US 2019/0240577 A1 Aug. 8, 2019

Related U.S. Application Data

(63) Continuation of application No. PCT/JP2017/037509, filed on Oct. 17, 2017.

(30) Foreign Application Priority Data

Nov. 7, 2016 (JP) .................................. 2016-217314
Feb. 9, 2017 (JP) .................................. 2017-022191

(51) Int. Cl.
*A63F 13/533* (2014.01)
*H04N 1/00* (2006.01)
(Continued)

(52) U.S. Cl.
CPC .......... *A63F 13/533* (2014.09); *A63F 13/211* (2014.09); *A63F 13/213* (2014.09);
(Continued)

(58) Field of Classification Search
CPC .... A63F 13/533; A63F 13/211; A63F 13/213; A63F 13/216; A63F 13/33; A63F 13/335;
(Continued)

(56) References Cited

U.S. PATENT DOCUMENTS 6,435,969 B1 * 8/2002 Tanaka .................... A63F 13/02
463/44
7,077,751 B2 * 7/2006 Nishiyama .............. A63F 13/08
463/43
(Continued)

FOREIGN PATENT DOCUMENTS

JP 2004-214920 A 7/2004
JP 2012-094101 A 5/2012
(Continued)

OTHER PUBLICATIONS

International Search Report issued in PCT/JP2017/037509; dated Jan. 9, 2018.
(Continued)

*Primary Examiner* — Allen Chan
(74) *Attorney, Agent, or Firm* — Studebaker & Brackett PC

(57) ABSTRACT

A print system, a server, a print method, and a program capable of bringing attention to a photo print of a player of an online game and acquiring a distinctive photo print suitable for communication are provided. A smartphone displays a composite image in which a captured image imaged by a camera unit and a computer graphics image showing a character and acquired from a game server during the online game are composited on a display unit, and acquires the composite image displayed on the display unit in a case where imaging instruction information is received. In a case where print instruction information is received, the smartphone generates a print image including the acquired composite image and status information related to the character of the game and acquired from the game server, and outputs the generated print image to a printer.

22 Claims, 15 Drawing Sheets

(51) Int. Cl.
*A63F 13/211* (2014.01)
*A63F 13/58* (2014.01)
*A63F 13/46* (2014.01)
*A63F 13/33* (2014.01)
*H04N 1/387* (2006.01)
*A63F 13/216* (2014.01)
*A63F 13/49* (2014.01)
*A63F 13/44* (2014.01)
*A63F 13/213* (2014.01)
*A63F 13/69* (2014.01)
*A63F 13/335* (2014.01)
*A63F 13/67* (2014.01)
*G06F 3/12* (2006.01)

(52) U.S. Cl.
CPC ............ *A63F 13/216* (2014.09); *A63F 13/33* (2014.09); *A63F 13/335* (2014.09); *A63F 13/44* (2014.09); *A63F 13/46* (2014.09); *A63F 13/49* (2014.09); *A63F 13/58* (2014.09); *A63F 13/67* (2014.09); *A63F 13/69* (2014.09); *G06F 3/1203* (2013.01); *G06F 3/1236* (2013.01); *G06F 3/1292* (2013.01); *H04N 1/00137* (2013.01); *H04N 1/00167* (2013.01); *H04N 1/00169* (2013.01); *H04N 1/00177* (2013.01); *H04N 1/00188* (2013.01); *H04N 1/387* (2013.01)

(58) Field of Classification Search
CPC .......... A63F 13/44; A63F 13/46; A63F 13/49; A63F 13/58; A63F 13/67; A63F 13/69; G06F 3/1203; G06F 3/1236; G06F 3/1292; H04N 1/00137; H04N 1/00167; H04N 1/00169; H04N 1/00177; H04N 1/00188; H04N 1/387
USPC ........................................................ 463/43
See application file for complete search history.

(56) References Cited

U.S. PATENT DOCUMENTS

| | | |
|---|---|---|
| 2003/0069069 A1 | 4/2003 | Kinjo et al. |
| 2004/0147314 A1 | 7/2004 | LeMay et al. |
| 2009/0322788 A1 | 12/2009 | Sawano |
| 2010/0255904 A1* | 10/2010 | Kidakarn ............... G03B 19/02 463/30 |
| 2011/0159960 A1* | 6/2011 | Ueshima ............... A63F 13/428 463/37 |
| 2011/0319148 A1 | 12/2011 | Kinnebrew et al. |
| 2012/0075285 A1 | 3/2012 | Oyagi et al. |
| 2012/0157197 A1 | 6/2012 | Watkins, Jr. et al. |
| 2013/0006403 A1 | 1/2013 | Moore et al. |
| 2013/0316773 A1 | 11/2013 | Boyd |
| 2013/0344954 A1 | 12/2013 | Mikoshiba et al. |
| 2014/0098391 A1 | 4/2014 | Tan |
| 2015/0328547 A1 | 11/2015 | Uriu |

FOREIGN PATENT DOCUMENTS

| | | |
|---|---|---|
| JP | 2013-059648 A | 4/2013 |
| JP | 2015-112386 A | 6/2015 |
| JP | 2016-022208 A | 2/2016 |

OTHER PUBLICATIONS

International Preliminary Report on Patentability and Written Opinion issued in PCT/JP2017/037509; dated May 7, 2019.

The extended European search report issued by the European Patent Office dated Aug. 6, 2019, which corresponds to European Patent Application No. 17868063.3 and is related to U.S. Appl. No. 16/389,845.

Communication pursuant to Article 94(3) EPC issued by the European Patent Office dated Jul. 23, 2020, which corresponds to European Patent Application No. 17 868 063.3-1208 and is related to U.S. Appl. No. 16/389,845.

* cited by examiner

FIG. 7

[USER DB]

| USER ID | PASSWORD | NAME | ... | SKILL LEVEL | INFORMATION RELATED TO CAPTURED CHARACTER | PRINT INFORMATION |
|---------|----------|------|-----|-------------|-------------------------------------------|-------------------|
| ABCXXXX1 | 123XXXXa | XX XX | ... | 15 | CHARACTER A, XXX, | |
| BCDXXXX2 | 765XXXXc | XX XX | ... | 10 | CHARACTER B, XXX, ... | |
| ...... | ...... | ...... | ...... | ...... | ...... | ...... |

PRINT SYSTEM, SERVER, PRINT METHOD, AND PROGRAM

CROSS-REFERENCE TO RELATED APPLICATIONS

The present application is a Continuation of PCT International Application No. PCT/JP2017/037509 filed on Oct. 17, 2017 claiming priority under 35 U.S.C § 119(a) to Japanese Patent Application No. 2016-217314 filed on Nov. 7, 2016 and Japanese Patent Application No. 2017-022191 filed on Feb. 9, 2017. Each of the above applications is hereby expressly incorporated by reference, in their entirety, into the present application.

BACKGROUND OF THE INVENTION

1. Field of the Invention

The present invention relates to a print system, a server, a print method, and a program and particularly, to a technology for outputting an image displayed on a camera-equipped information terminal as a print.

2. Description of the Related Art

In the related art, a game apparatus that overlays a computer graphics image (hereinafter, referred to as a "CG image") on a real image showing a real space captured by a camera and thus, generates a composite image such that a virtual object not present in the real space is present, and displays the generated composite image on a display unit has been suggested (JP2012-094101A).

The game apparatus disclosed in JP2012-094101A repeatedly acquires a captured image imaged by a real camera and repeatedly calculates position and attitude information that is decided in accordance with the position and the attitude of the real camera in the real space. In addition, a virtual object (CG image) or the like to be additionally displayed in the captured image is set, and the display position, the attitude, the display state, and the like of the CG image are set based on a recognition result of a voice input into a voice input device. The composite image repeatedly generated by superimposing the CG image of which the display position and the like are set on the captured image is displayed on the display unit using the position corresponding to the position and attitude information in the captured image as a reference.

In addition, in the related art, a game console that outputs a character card usable in a game as a print has been suggested (JP2013-059648A).

The game console disclosed in JP2013-059648A composites, in accordance with a basic format (layout information), each information (status information) that changes depending on an image of a character such as a monster appearing in the game in the progress of the game such as a monster training game, an action game, or a role playing game, and a game result, and creates the character card by printing the composite image on a paper medium.

SUMMARY OF THE INVENTION

In JP2012-094101A, display of the composite image acquired by compositing the CG image with the captured image on the display unit of the game apparatus is disclosed, but output of the composite image displayed on the display unit as a print is not disclosed.

The game console disclosed in JP2013-059648A can create the character card on which the image of the character appearing in the game and the status information associated with the game result are printed. However, the image of the character is an image stored in advance as game data. Thus, in a case where the image of the same character is selected, the character card on which the same image is printed is created. That is, since the image of the character prepared on the game console side is printed on the character card created by the game console disclosed in JP2013-059648A, a plurality of players can possess character cards on which the same image is printed, but cannot possess a unique character card.

In addition, the invention disclosed in JP2013-059648A has features such that the character card (status information and the like) created by the game console can be used in the subsequent games by subsequently reading the character card in the game console, and thus, continuous training of the character, that is, continuous game play, is prompted, and an increase in the number of plays is prompted. The invention is advantageous in the case of an arcade game console. In the case of the game console owned by a player who can continuously play the game, the status information and the like related to the game may be held on the game console side because the character card is almost not needed.

Furthermore, the character card created by the game console disclosed in JP2013-059648A is considered to be used for communication by showing the character card (composite image) to others. However, the intention of the player cannot be reflected on the image printed on the character card, and the image lacks originality and attraction.

The present invention is conceived in view of such a matter. An object of the present invention is to provide a print system, a server, a print method, and a program capable of bringing attention to a photo print of a player of an online game and acquiring a distinctive photo print suitable for communication.

In order to achieve the object, an aspect of the present invention is a print system applied to a game system that includes a server and a camera-equipped portable terminal communicating with each other through a network and provides an online game through the network. The server includes a status information generation unit that generates status information related to a character of the game during the online game, and a server-side communication unit that transmits a computer graphics image showing the character and the status information to the camera-equipped portable terminal during the online game. The camera-equipped portable terminal includes an imaging unit, a terminal-side communication unit that receives the computer graphics image and the status information from the server, a composite image generation unit that generates a composite image in which a captured image imaged by the imaging unit and the received computer graphics image are composited, a display unit that displays the generated composite image, a composite image acquisition unit that acquires the composite image displayed on the display unit in a case where imaging instruction information is received, a print image generation unit that generates a print image including the acquired composite image and information including the received status information in a case where print instruction information is received, and an output unit that outputs the print image generated by the print image generation unit to a printer.

According to an aspect of the present invention, the camera-equipped portable terminal displays the composite image in which the captured image (for example, a live view image) imaged by the imaging unit and the computer graphics image showing the character and acquired from the server during the online game are composited on the display unit. In a case where the imaging instruction information is received, the composite image displayed on the display unit is acquired. In a case where the print instruction information is received, the print image including the acquired composite image and the status information related to the character of the game and acquired from the server is generated, and the generated print image is output to the printer. Accordingly, the photo print in which the status information is added to the composite image in which the captured image and the computer graphics image are composited can be acquired.

The photo print is a distinctive photo print suitable for communication for the player of the online game and can also be used for a trading card game. In addition, the player of the online game can be prompted to create the photo print. The status information related to the character of the game may include information such as a hit point, an attack point, and equipment of the character.

In the print system according to another aspect of the present invention, it is preferable that the camera-equipped portable terminal includes a personal information acquisition unit that acquires personal information related to a user, and the print image generation unit generates the print image by compositing the received status information and the acquired personal information related to the user with the composite image.

According to another aspect of the present invention, the photo print in which the personal information related to the user is embedded can be acquired. The personal information related to the user may include user identification information, a password, a name (a real name or a nickname), a skill level for the game, a mail address, and the like.

In the print system according to still another aspect of the present invention, it is preferable that the print image generation unit generates the print image by compositing the composite image with a text image or a barcoded code image showing the information including the status information. Accordingly, the photo print that is printed in a general-purpose printer by embedding the information including the status information in the composite image can be acquired.

It is preferable that the print system according to still another aspect of the present invention further comprises a printer that creates a photo print by printing the print image output from the output unit on a print medium, the printer printing the composite image in the print image using visible ink and printing the text image or the barcoded code image showing the information including the status information using invisible ink. Accordingly, the information including the status information may not be seen to eyes of a person on the photo print. Particularly, in a case where the information including the status information is printed in an overlapping manner on the composite image printed using the visible ink, visual recognition of the composite image may not be hindered by the information including the status information. Infrared ink or ultraviolet ink can be applied as the invisible ink.

In the print system according to still another aspect of the present invention, it is preferable that the camera-equipped portable terminal includes an imaging unit imaging the text image or the code image printed using the invisible ink and acquires the information including the status information based on the text image or the code image imaged by the imaging unit. In a case where the invisible ink is infrared ink, the imaging unit radiates infrared light to the photo print and acquires the text image or the code image by receiving the infrared light reflected by the text image or the code image printed using infrared ink.

In the print system according to still another aspect of the present invention, it is preferable that the camera-equipped portable terminal includes a layout information acquisition unit that acquires layout information for arranging a print element including the composite image and the information including the status information in a photo print, and the print image generation unit generates the print image in which the composite image and the information including the status information are arranged in accordance with the layout information acquired by the layout information acquisition unit.

In the print system according to still another aspect of the present invention, it is preferable that the camera-equipped portable terminal includes a positional information detection unit detecting positional information indicating a position of the camera-equipped portable terminal and transmits the print instruction information and the positional information detected by the positional information detection unit to the server from the terminal-side communication unit in a case where the print instruction information is received, the status information generation unit generates the status information or information for changing the status information depending on the received positional information in a case where the server-side communication unit receives the print instruction information and the positional information, and the server-side communication unit transmits the generated status information or the information for changing the status information to the camera-equipped portable terminal.

According to still another aspect of the present invention, the server generates the status information or the information for changing the status information depending on the positional information related to the camera-equipped portable terminal at the time of receiving the print instruction information from the camera-equipped portable terminal. Thus, for example, the player of the online game (the user of the camera-equipped portable terminal) can be prompted to move to a position at which status information having a higher numerical value or the information for changing the status information (a numerical value to be added or multiplied with the numerical value of the current status information) is acquired.

In the print system according to still another aspect of the present invention, it is preferable that the status information generation unit generates the status information or the information for changing the status information depending on a degree of match between the received positional information and positional information originating from the character corresponding to the computer graphics image included in the composite image, a degree of match between the positional information indicating the position of the camera-equipped portable terminal at a time of receiving the print instruction information and positional information indicating an imaging position of the captured image, or a degree of match between an attribute of a location related to the received positional information and an attribute of the character corresponding to the computer graphics image included in the composite image. For example, in the case of a horseshoe crab type character, the positional information originating from the character is positional information related to a location where the horseshoe crab lives. In addition, in a case where the attribute of the character is, for example, a water type, and the attribute of the location related to the positional information is a waterfront, the degree of match between both attributes is increased.

In the print system according to still another aspect of the present invention, it is preferable that the camera-equipped portable terminal transmits information indicating an elapsed time from imaging of the captured image until reception of the print instruction information to the server from the terminal-side communication unit in a case where the print instruction information is received, and in a case where the server-side communication unit receives the print instruction information and the information indicating the elapsed time, the status information generation unit generates the status information or information for changing the status information depending on the received information indicating the elapsed time. For example, as the elapsed time from imaging of the captured image until reception of the print instruction information is increased, status information having a higher numerical value is acquired.

In the print system according to still another aspect of the present invention, it is preferable that the camera-equipped portable terminal includes a positional information detection unit detecting positional information indicating an imaging position of the captured image and an azimuthal information detection unit detecting azimuthal information indicating an imaging direction and transmits the print instruction information, the positional information detected by the positional information detection unit, and the azimuthal information detected by the azimuthal information detection unit to the server from the terminal-side communication unit in a case where the print instruction information is received, and in a case where the server-side communication unit receives the print instruction information, the positional information, and the azimuthal information, the status information generation unit calculates an imaging range of the camera-equipped portable terminal based on the received positional information and the azimuthal information and generates the status information or information for changing the status information depending on a subject in the calculated imaging range.

A server according to still another aspect of the present invention constitutes the print system.

An invention according to still another aspect is a server communicating with a camera-equipped portable terminal of a user through a network and providing an online game. The server comprises a status information generation unit that generates status information related to a character of the game during the online game, a server-side communication unit that transmits a computer graphics image showing the character and the status information to the camera-equipped portable terminal during the online game and receives a composite image in which a captured image imaged by the camera-equipped portable terminal and the computer graphics image are composited, and print instruction information indicating an instruction to print the composite image, and a print image generation unit that generates a print image including the composite image and information including the status information in a case where the server-side communication unit receives the print instruction information. The server-side communication unit transmits the generated print image to the camera-equipped portable terminal or a printer.

According to still another aspect of the present invention, the print image is generated in the server, and the generated print image is transmitted to the camera-equipped portable terminal or the printer. The composite image is acquired from the camera-equipped portable terminal along with the print instruction information.

It is preferable that the server according to still another aspect of the present invention further comprises a database that manages personal information related to the user of the camera-equipped portable terminal, in which the print image generation unit generates the print image including the composite image, the status information, and the personal information related to the user and acquired from the database.

In the server according to still another aspect of the present invention, it is preferable that the print image generation unit generates the print image in which the composite image and a text image or a barcoded code image showing the information including the status information are composited.

It is preferable that the server according to still another aspect of the present invention further comprises a layout information acquisition unit that acquires layout information for arranging a print element including the composite image and the information including the status information in a photo print, in which the print image generation unit generates the print image in which the composite image and the information including the status information are arranged in accordance with the layout information acquired by the layout information acquisition unit.

It is preferable that the server according to still another aspect of the present invention further comprises a positional information detection unit that detects positional information indicating an imaging position of the captured image imaged by the camera-equipped portable terminal, in which the status information generation unit generates the status information depending on the detected positional information.

In the server according to still another aspect of the present invention, it is preferable that the status information generation unit generates the status information depending on a degree of match between the received positional information and positional information originating from the character corresponding to the computer graphics image included in the composite image, a degree of match between the positional information indicating a position of the camera-equipped portable terminal at a time of receiving the print instruction information and the positional information indicating the imaging position of the captured image, or a degree of match between an attribute of a location related to the acquired positional information and an attribute of the character corresponding to the computer graphics image included in the composite image.

In the server according to still another aspect of the present invention, it is preferable that the status information generation unit generates the status information depending on an elapsed time from imaging of the captured image until reception of the print instruction information.

It is preferable that the server according to still another aspect of the present invention further comprises an imaging information acquisition unit that acquires positional information indicating an imaging position of the captured image imaged by the camera-equipped portable terminal and azimuthal information indicating an imaging direction, in which the status information generation unit calculates an imaging range of the camera-equipped portable terminal based on the acquired positional information and the azimuthal information and generates the status information depending on a subject in the calculated imaging range.

An invention according to still another aspect is a print method applied to a game system that includes a server and a camera-equipped portable terminal communicating with each other through a network and provides an online game through the network. The print method comprises a step of acquiring a computer graphics image showing a character of the game and status information related to the character from the server during the online game, a step of generating a composite image in which a captured image acquired by an imaging unit of the camera-equipped portable terminal and the computer graphics image are composited, a step of displaying the generated composite image on a display unit of the camera-equipped portable terminal, a step of acquiring the composite image displayed on the display unit in a case where imaging instruction information is received, a step of generating a print image including the acquired composite image and information including the status information in a case where print instruction information is received, and a step of outputting the generated print image to a printer.

An invention according to still another aspect is a program applied to a game system that includes a server and a camera-equipped portable terminal communicating with each other through a network and provides an online game through the network. The program causes the camera-equipped portable terminal to execute a function of acquiring a computer graphics image showing a character of the game and status information related to the character from the server during the online game, a function of generating a composite image in which a captured image acquired by an imaging unit of the camera-equipped portable terminal and the computer graphics image are composited, a function of displaying the generated composite image on a display unit of the camera-equipped portable terminal, a function of acquiring the composite image displayed on the display unit in a case where imaging instruction information is received, a function of generating a print image including the acquired composite image and information including the status information in a case where print instruction information is received, and a function of outputting the generated print image to a printer.

An invention according to still another aspect is a print system applied to a game system that includes a server and a camera-equipped portable terminal communicating with each other through a network and provides an online game through the network. The server includes a database that manages personal information related to a user of the camera-equipped portable terminal, character identification information specifying a character appearing in the online game, and print identification information related to a photo print in association with each other, a status information generation unit that generates status information related to the character and including the character identification information, a server-side communication unit that transmits a computer graphics image showing the character and the status information to the camera-equipped portable terminal during the online game, and a genuineness determination unit that determines genuineness of the photo print. The camera-equipped portable terminal includes an imaging unit, a terminal-side communication unit that receives the computer graphics image and the status information from the server, a composite image generation unit that generates a composite image in which the received computer graphics image and the status information are composited, a display unit that displays the generated composite image, a composite image acquisition unit that acquires the composite image displayed on the display unit in a case where print instruction information is received, a print image generation unit that generates a print image including the acquired composite image, the received status information, and the personal information related to the user of the camera-equipped portable terminal and registered in the database, an output unit that outputs the print image generated by the print image generation unit to a printer, and a genuineness determination request unit that requests the server to determine the genuineness of the photo print. The print system comprises the printer that creates the photo print by printing the print image received from the camera-equipped portable terminal on a print medium, the printer printing the print image on the print medium in which the print identification information is printed in a margin region other than a print region. The genuineness determination request unit causes the imaging unit to image the photo print in a case of requesting the determination of the genuineness of the photo print, acquires the personal information, the character identification information, and the print identification information printed on the photo print, and transmits the acquired personal information, the character identification information, and the print identification information to the server from the terminal-side communication unit. In a case where the server-side communication unit receives the personal information, the character identification information, and the print identification information from the camera-equipped portable terminal, the genuineness determination unit compares the received personal information, the character identification information, and the print identification information with information registered in the database, determines that the photo print is genuine in a case where matching information is not present to register the received personal information, the character identification information, and the print identification information in the database in association with each other, and determines that the photo print is fake in a case where the matching information is present. The server-side communication unit transmits a determination result of the genuineness determination unit for the genuineness to the camera-equipped portable terminal.

According to still another aspect of the present invention, the server manages the personal information related to the user of the camera-equipped portable terminal, the character identification information, and the print identification information related to the photo print by the database. Then, in a case where the same photo print as the photo print created in the above manner is replicated, the genuineness of the photo print can be determined by the server. In the determination of the genuineness of the photo print, the personal information, the character identification information, and the print identification information read from the photo print are compared with the information registered in the database. It is determined that the photo print is genuine in a case where the matching information is not present in the database. It is determined that the photo print from which information is read is fake in a case where the matching information is present. The print identification information that uniquely specifies the print medium is printed on the photo print. Thus, even in a case where the personal information and the character identification information printed on the photo print are duplicated by invalid replication, the genuineness of the photo print can be determined based on the print identification information. In a case where the personal information and the character identification information printed on the photo print are not registered in the database, it is determined that the photo print is genuine, and the print identification information is registered in the database along with the personal information and the character identification information.

According to the present invention, the print image in which the status information related to the character is added to the composite image in which the captured image and the computer graphics image of the character of the game are composited can be generated. A distinctive photo print suitable for communication can be acquired by outputting the print image to the printer.

BRIEF DESCRIPTION OF THE DRAWINGS

FIG. 7 is a table illustrating one example of personal information related to a user managed in a user database.

DESCRIPTION OF THE PREFERRED EMBODIMENTS

Hereinafter, embodiments of a print system, a server, a print method, and a program according to the present invention will be described in accordance with the appended drawings.

Figure 1:
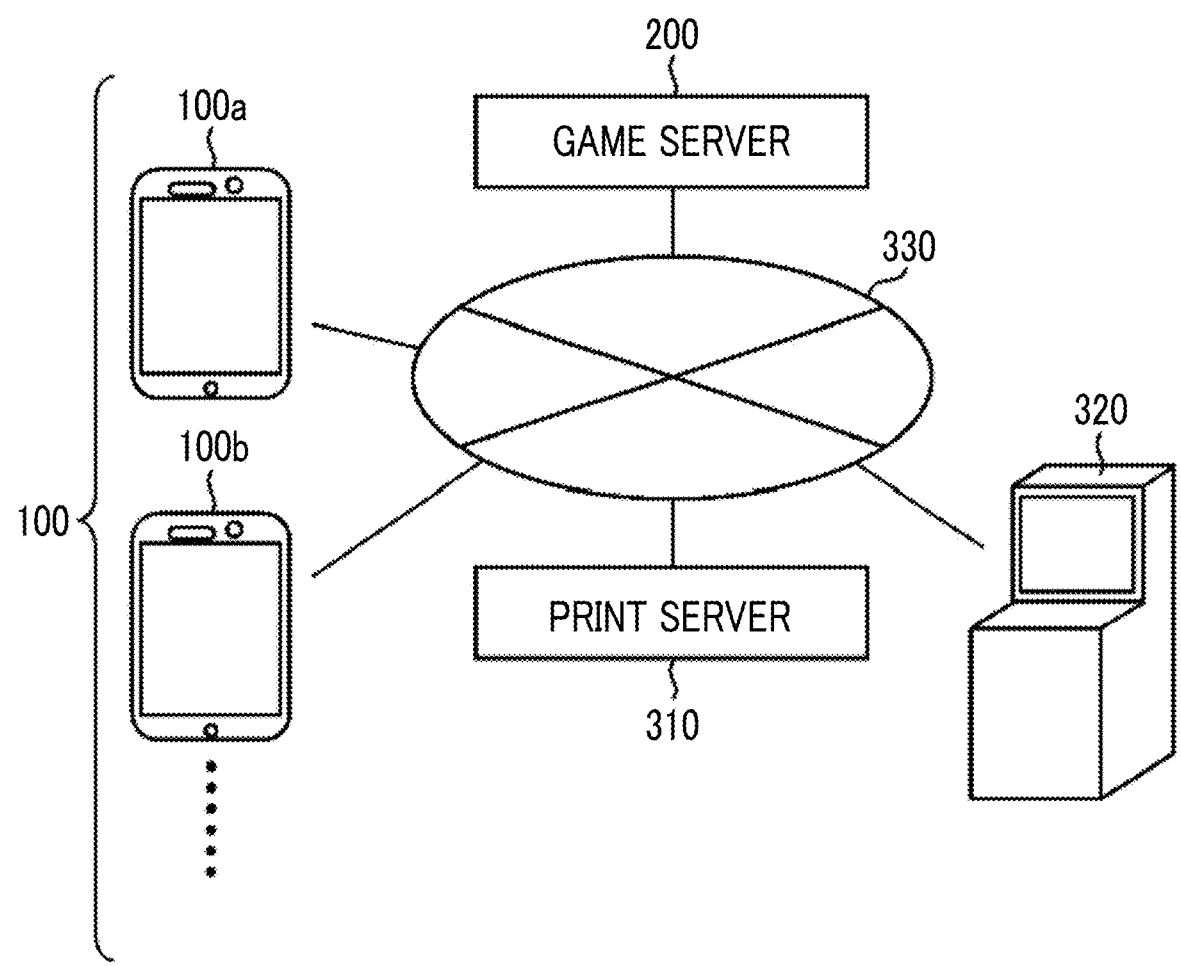
FIG. 1 is a conceptual diagram of a system to which a print system according to an embodiment of the present invention is applied.

FIG. 1 is a conceptual diagram of a game system to which the print system according to the embodiment of the present invention is applied. The game system is configured with a camera-equipped information terminal 100 (100a, 100b, . . . ) for each user, a game server 200, a print server 310, and a camera-equipped stationary terminal 320. The camera-equipped information terminal 100, the game server 200, the print server 310, the camera-equipped stationary terminal 320, and the like are connected through a network 330 such as the Internet.

For example, the type of camera-equipped information terminal 100 (100a, 100b, . . . ) may be a smartphone, a portable information terminal, a game apparatus, and a tablet terminal.

Game application software in the present example is a game that uses a camera of the camera-equipped information terminal 100, global positioning system (GPS) information, motion information detected by a motion sensor unit, and the like and uses augmented reality (AR) such that a virtual object (a character or the like of the game) appears in a captured image imaged by the camera. In addition, a program for creating a print image in the camera-equipped information terminal 100 is embedded in the application software. Details of the game server 200 will be described below.

The print server 310 receives a print order image from the camera-equipped information terminal 100 through the network 330, creates a photo print, an album, and the like based on the received image, or creates a photo print based on the print image created by the game server 200.

The camera-equipped stationary terminal 320 is a stationary terminal or an arcade game console installed at the storefront of various stores such as a photo studio, a bookstore, and a supermarket. The camera-equipped stationary terminal 320 receives the photo print from the camera-equipped information terminal 100, reads information related to the photo print, and provides necessary information to the camera-equipped information terminal 100.

<Camera-Equipped Information Terminal 100>

Hereinafter, a smartphone that may function as the camera-equipped information terminal 100 will be described.

Figure 2:
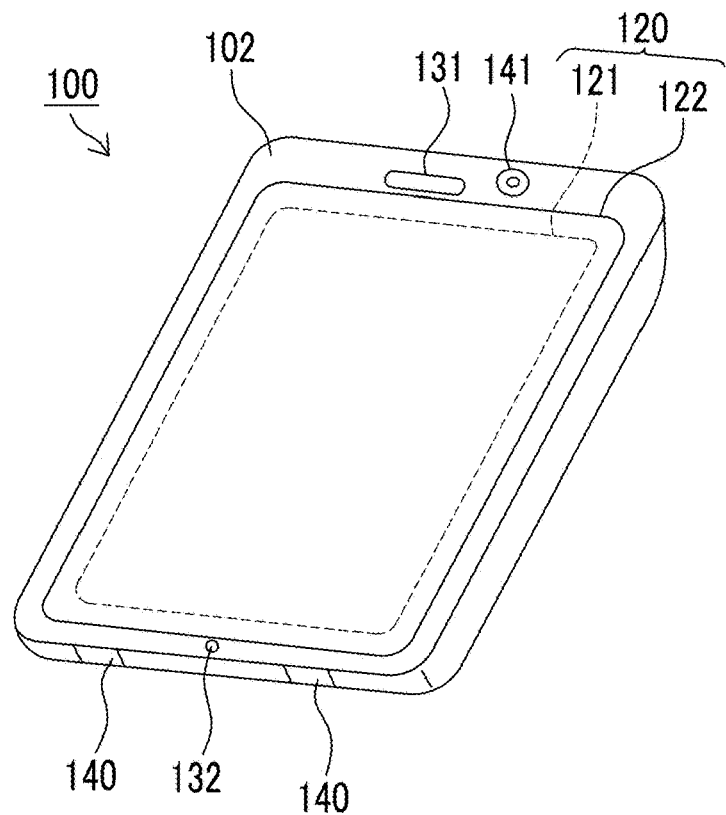
FIG. 2 is a perspective view of a smartphone seen from a front surface side (operation surface side) of a smartphone 100 that is one embodiment of a camera-equipped information terminal.
Figure 3:
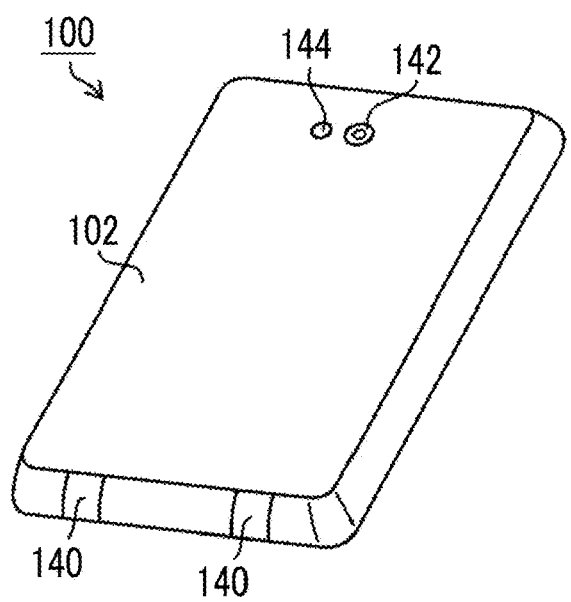
FIG. 3 is a perspective view of the smartphone 100 seen from a rear surface side of the smartphone.

Each of FIG. 2 and FIG. 3 is a diagram illustrating the exterior of the smartphone that is one embodiment of the camera-equipped information terminal 100. FIG. 2 is a perspective view of the camera-equipped information terminal 100 seen from a front surface side (operation surface side) of the camera-equipped information terminal 100. FIG. 3 is a perspective view of the camera-equipped information terminal 100 seen from a rear surface side of the camera-equipped information terminal 100.

The camera-equipped information terminal (hereinafter, referred to as the "smartphone") 100 illustrated in FIG. 2 and FIG. 3 includes a casing 102 having a shape of a flat plate. A display and input unit 120 in which a display panel 121 as a display unit and an operation panel 122 as an input unit are formed as a single body is disposed on one surface of the casing 102. In addition, the casing 102 comprises a speaker 131, a microphone 132, an operation unit 140, camera units 141 and 142 (imaging units) and a light emitting diode (LED) light 144. The configuration of the casing 102 is not for limitation purposes. For example, a configuration in which the display unit and the input unit are independently disposed can be employed, or a configuration having a folded structure or a slide mechanism can be employed.

Figure 4:
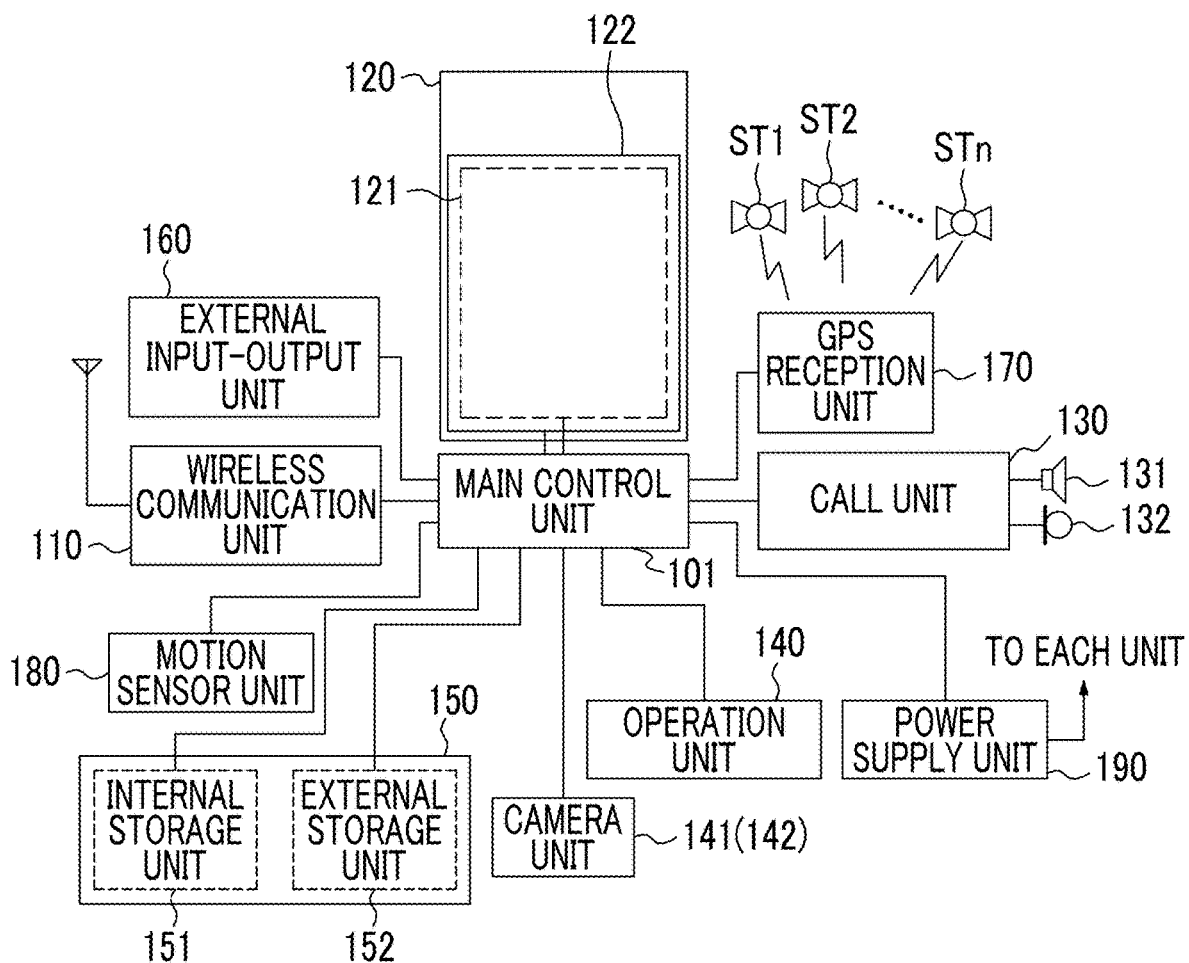
FIG. 4 is a block diagram illustrating an internal configuration of the smartphone 100.

FIG. 4 is a block diagram illustrating an internal configuration of the smartphone 100 illustrated in FIG. 2 and FIG. 3. As illustrated in FIG. 4, main constituents of the smartphone 100 comprise a wireless communication unit 110 (terminal-side communication unit), the display and input unit 120, a call unit 130, the operation unit 140, the camera units 141 and 142, a storage unit 150, an external input-output unit 160 (output unit), a GPS reception unit 170, a motion sensor unit 180, a power supply unit 190, and a main control unit 101. In addition, a main function of the smartphone 100 comprises a wireless communication function of performing mobile wireless communication with a base station apparatus through a mobile communication network.

The wireless communication unit 110 performs wireless communication with the base station apparatus connected to the mobile communication network in accordance with an instruction from the main control unit 101. Transmission and reception of various file data such as voice data and image data, electronic mail data, and the like, and reception of web data, streaming data, and the like are performed using the wireless communication.

The display and input unit 120 is a so-called touch panel comprising the operation panel 122 disposed on a screen of the display panel 121. The display and input unit 120 visually delivers information to the user by displaying images (still images and moving images), text information, and the like and detects a user operation in response to the displayed information under control of the main control unit 101. The operation panel 122 will be referred to as a touch panel for convenience.

The display panel 121 uses a liquid crystal display (LCD), an organic electro-luminescence display (OELD), or the like as a display device. The operation panel 122 is a device that is disposed in a state where an image displayed on a display surface of the display panel 121 can be visually recognized, and detects one or a plurality of coordinates operated by a finger of the user or a stylus. In a case where the device is operated by the finger of the user or the stylus, the operation panel 122 outputs a detection signal caused by the operation to the main control unit 101. Next, the main control unit 101 detects an operation position (coordinates) on the display panel 121 based on the received detection signal.

The display panel 121 and the operation panel 122 of the smartphone 100 illustrated in FIG. 2 constitute the display and input unit 120 as a single body. The operation panel 122 is arranged to completely cover the display panel 121. In the case of employing such an arrangement, the operation panel 122 may comprise a function of detecting the user operation even in a region outside the display panel 121. In other words, the operation panel 122 may comprise a detection region (hereinafter, referred to as a "display region") for an overlapping part in overlap with the display panel 121 and a detection region (hereinafter, referred to as a "non-display region") for a peripheral part other than the overlapping part not in overlap with the display panel 121.

While the size of the display region may completely match the size of the display panel 121, both sizes may not necessarily match. In addition, the operation panel 122 may comprise two sensitive regions including the peripheral part and an inner part other than the peripheral part. Furthermore, the width of the peripheral part is appropriately designed depending on the size and the like of the casing 102. Furthermore, a position detection method employed in the operation panel 122 is exemplified by a matrix switch method, a resistive film method, a surface acoustic wave method, an infrared method, an electromagnetic induction method, an electrostatic capacitive method, and the like. Any method may be employed.

The call unit 130 comprises the speaker 131 and the microphone 132. The call unit 130 converts the voice of the user input through the microphone 132 into voice data processable in the main control unit 101 and outputs the voice data to the main control unit 101, or decodes the voice data received by the wireless communication unit 110 or the external input-output unit 160 and outputs the decoded voice data from the speaker 131. In addition, as illustrated in FIG. 2, for example, the speaker 131 and the microphone 132 can be mounted on the same surface as the surface on which the display and input unit 120 is disposed.

The operation unit 140 is a hardware key in which a key switch or the like is used, and receives an instruction from the user. For example, as illustrated in FIG. 2, the operation unit 140 is a push-button type switch that is mounted on a side surface of the casing 102 of the smartphone 100 and is set to be in a switch ON state in a case where the operation unit 140 is pressed with a finger or the like and is set to be in a switch OFF state by restoring force of a spring or the like in a case where the finger is released.

The storage unit 150 stores a control program and control data of the main control unit 101, the game application software (including the program according to the embodiment of the present invention), address data in which the name, the telephone number, and the like of a communication counterpart are associated, data of transmitted and received electronic mails, web data downloaded by web browsing, and downloaded contents data. In addition, the storage unit 150 temporarily stores streaming data and the like.

In addition, the storage unit 150 is configured with an internal storage unit 151 incorporated in the smartphone and an external storage unit 152 including an external memory slot where an external memory can be attached and detached. Each of the internal storage unit 151 and the external storage unit 152 constituting the storage unit 150 is implemented using a storage medium such as a memory of a flash memory type, a hard disk type, a multimedia card micro type, or a card type, a random access memory (RAM), or a read only memory (ROM).

The external input-output unit 160 operates as an interface for all external devices connected to the smartphone 100 and is directly or indirectly connected to other external devices by communication or the like (for example, Universal Serial Bus (USB) or IEEE 1394) or a network (for example, a network, a wireless local area network (LAN), Bluetooth (registered trademark), radio frequency identification (RFID), infrared communication (infrared data association (IrDA)), Ultra Wideband (UWB) (registered trademark), or ZigBee (registered trademark)).

For example, the external devices connected to the smartphone 100 are a wired or wireless headset, a wired or wireless external charger, a wired or wireless data port, a memory card or a subscriber identity module (SIM) card/user identity module (UIM) card connected through a card socket, an external audio and video device connected through an audio and video input/output (I/O) terminal, an external audio and video device connected in a wired or wireless manner, a smartphone, a personal computer, a personal digital assistant (PDA), and an earphone. The external input-output unit 160 may be configured to deliver data transferred from the external devices to each constituent inside the smartphone 100 or transfer data inside the smartphone 100 to the external devices.

The GPS reception unit 170 functioning as a positional information detection unit that detects the position of the smartphone 100 receives a GPS signal transmitted from GPS satellites ST1, ST2, . . . STn, executes a position measurement calculation process based on the plurality of received GPS signals, and acquires positional information (GPS information) specified by the latitude, the longitude, and the altitude of the smartphone 100 in accordance with an instruction from the main control unit 101. In a case where the positional information can be acquired from the wireless communication unit 110 and/or the external input-output unit 160 (for example, a wireless LAN), the GPS reception unit 170 can detect the position using the positional information.

The motion sensor unit 180 comprises, for example, a three-axis acceleration sensor and detects a physical motion of the smartphone 100 in accordance with an instruction from the main control unit 101. By detecting the physical motion of the smartphone 100, a direction or acceleration of movement of the smartphone 100 is detected. The detection result is output to the main control unit 101. In addition, it is preferable that the smartphone 100 comprises an azimuthal information detection unit (electronic compass) that detects azimuthal information indicating an imaging direction of the camera unit 142.

The power supply unit 190 supplies power stored in a battery (not illustrated) to each unit of the smartphone 100 in accordance with an instruction from the main control unit 101.

The main control unit 101 comprises a microprocessor. The main control unit 101 operates in accordance with the control program and the control data stored in the storage unit 150 and manages and controls each unit of the smartphone 100. In addition, the main control unit 101 comprises a mobile communication control function of controlling each unit of a communication system and an application processing function in order to perform voice communication and data communication through the wireless communication unit 110.

The application processing function is implemented by operating the main control unit 101 in accordance with the application software stored in the storage unit 150. For example, the application processing function is an infrared communication function of performing data communication with an opposing device by controlling the external input-output unit 160, an electronic mail function of transmitting and receiving electronic mails, or a web browsing function of browsing a web page.

In addition, the main control unit 101 comprises an image processing function such as displaying a video on the display and input unit 120 based on image data (still image or moving image data) such as reception data or downloaded streaming data. The image processing function is a function of causing the main control unit 101 to decode the image data, perform image processing on the decoding result, and display an image acquired through the image processing on the display and input unit 120.

Furthermore, the main control unit 101 executes display control for the display panel 121 and operation detection control for detecting the user operation through the operation unit 140 or the operation panel 122.

By executing the display control, the main control unit 101 displays an icon for starting the application software or a software key such as a scroll bar or displays a window for composing an electronic mail. The scroll bar is a software key for a large image or the like not accommodated in the display region of the display panel 121 in order to receive an instruction to move a display part of the image.

In addition, by executing the operation detection control, the main control unit 101 detects the user operation through the operation unit 140, receives an operation performed on the icon or an input of a text string in an input field of the window through the operation panel 122, or receives a scroll request for the display image through the scroll bar.

Furthermore, by executing the operation detection control, the main control unit 101 comprises a touch panel control function of determining whether the operation position on the operation panel 122 corresponds to the overlapping part (display region) in overlap with the display panel 121 or the peripheral part (non-display region) other than the overlapping part not in overlap with the display panel 121 and controlling the sensitive region of the operation panel 122 and the display position of the software key.

In addition, the main control unit 101 can detect a gesture operation performed on the operation panel 122 and execute a preset function depending on the detected gesture operation. The gesture operation is not a simple touch operation in the related art and means an operation of drawing a trajectory with a finger or the like, specifying a plurality of positions at the same time, or drawing a trajectory from at least one of the plurality of positions by combining the drawing with the specifying.

The camera units 141 and 142 disposed on the front surface side and the rear surface side of the smartphone 100 can convert the image data acquired by imaging into compressed image data such as joint photographic experts group (JPEG) and record the image data in the storage unit 150 or output the image data through the external input-output unit 160 or the wireless communication unit 110 under control of the main control unit 101. The camera unit 141 is mainly used for self-imaging, and the camera unit 142 is used for typical imaging. The camera units 141 and 142 may be switched and used alone or may be used at the same time.

In addition, the camera units 141 and 142 can be used in various functions of the smartphone 100. For example, the image acquired by the camera units 141 and 142 may be displayed on the display panel 121. The image imaged and acquired by the camera units 141 and 142 may be used as one of operation input methods for the operation panel 122. In addition, in a case where the GPS reception unit 170 detects the position, the position may be detected with reference to the image from the camera units 141 and 142. Furthermore, with reference to the image from the camera units 141 and 142, a determination of an optical axis direction of the camera unit 141 of the smartphone 100 and a determination of the current usage environment can be performed without using the three-axis acceleration sensor or along with the three-axis acceleration sensor. The image from the camera units 141 and 142 can also be used in the application software.

It is preferable that the LED light 144 illustrated in FIG. 3 for illumination can emit white light or infrared light. In a case where infrared light is emitted from the LED light 144, it is preferable that the camera unit 142 can perform infrared imaging. For example, infrared imaging can be performed using an image sensor having sensitivity to the wavelength range of the infrared ray as the image sensor of the camera unit 142. The camera unit 142 that can perform infrared imaging is applied in the case of imaging information (a text image or a code image described below) that is printed using invisible ink (infrared ink).

Besides, data acquired by adding the positional information acquired by the GPS reception unit 170, voice information (may be converted into text information by voice text conversion by the main control unit or the like) acquired by the microphone 132, attitude information acquired by the motion sensor unit 180, or the like to image data of a still image or a moving image can be recorded in the storage unit 150 or output through the external input-output unit 160 or the wireless communication unit 110.

The smartphone 100 having the above configuration can communicate with the game server 200 and perform an online game by causing the main control unit 101 to execute the game application software (hereinafter, referred to as the "game application") downloaded from the game server 200. In addition, a program for generating the print image in the smartphone 100 is embedded in the game application. The smartphone 100 can perform imaging by the camera unit 142 during the online game and display the captured image (live view image) on the display and input unit 120 of the smartphone 100. In addition, in a case where imaging instruction information is input, the captured image displayed on the display and input unit 120 can be acquired as a still image, and the print image can be generated. Furthermore, the photo print on which the print image is printed can be acquired by transmitting the generated print image to a mobile printer or the print server 310.

A detailed operation of the smartphone 100 executing the game application will be described below.

<Game Server 200>

Figure 5:
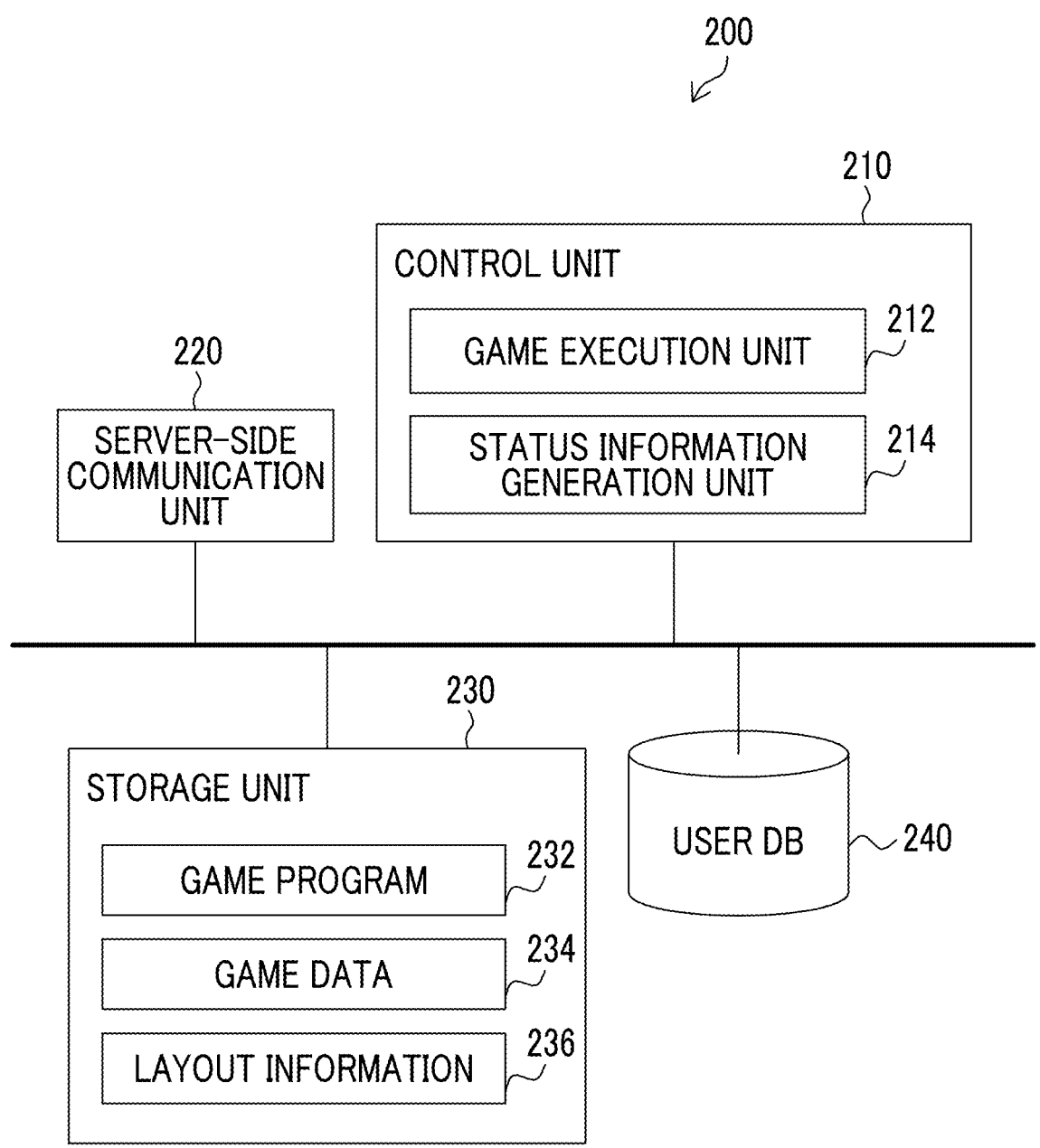
FIG. 5 is a block diagram illustrating a first embodiment of a game server applied to a game system illustrated in FIG. 1.

FIG. 5 is a block diagram illustrating a first embodiment of the game server applied to the game system illustrated in FIG. 1.

As illustrated in FIG. 5, the game server 200 mainly comprises a control unit 210, a server-side communication unit 220, a storage unit 230, and a user database (user DB) 240.

The server-side communication unit 220 is a part that communicates with the smartphone 100 (wireless communication unit 110) executing the game application through the network 330 and transmits and receives necessary information with the smartphone 100. The server-side communication unit 220 exchanges information necessary for executing the online game in the smartphone 100 and functions as an imaging information acquisition unit that acquires the positional information indicating the current position of the smartphone 100, the azimuthal information indicating the imaging direction of the camera unit 142, and positional information indicating an imaging position and azimuthal information indicating an imaging direction for the captured image imaged by the camera unit 142 during the online game. In addition, the server-side communication unit 220 transmits the CG image showing the character appearing in the game and status information associated with the character of the game to the smartphone 100 during the online game.

The storage unit 230 stores a game program 232, game data 234, layout information 236, and the like. The game program 232 is a program necessary for executing the online game in the smartphone 100 and includes the game application that is provided to the user in a case where a request for downloading the online game is made from the smartphone 100 of a new user.

The game data 234 may include the CG image and the character name of each character appearing in the game during the progress of the game, an attribute of the character (for example, a water type), positional information originating from the character (in the case of a horseshoe crab type character, positional information related to a location where the horseshoe crab lives), the rarity of the character, and status information that is associated with the character and is different for each character and changes depending on a game result and the like. The status information may include information such as a hit point, an attack point, and equipment of the character.

The layout information 236 is information for arranging print elements including the composite image, described below, in which the captured image and the CG image of the character are composited, and information including the status information related to the character in the composite image in the photo print.

Figure 6:
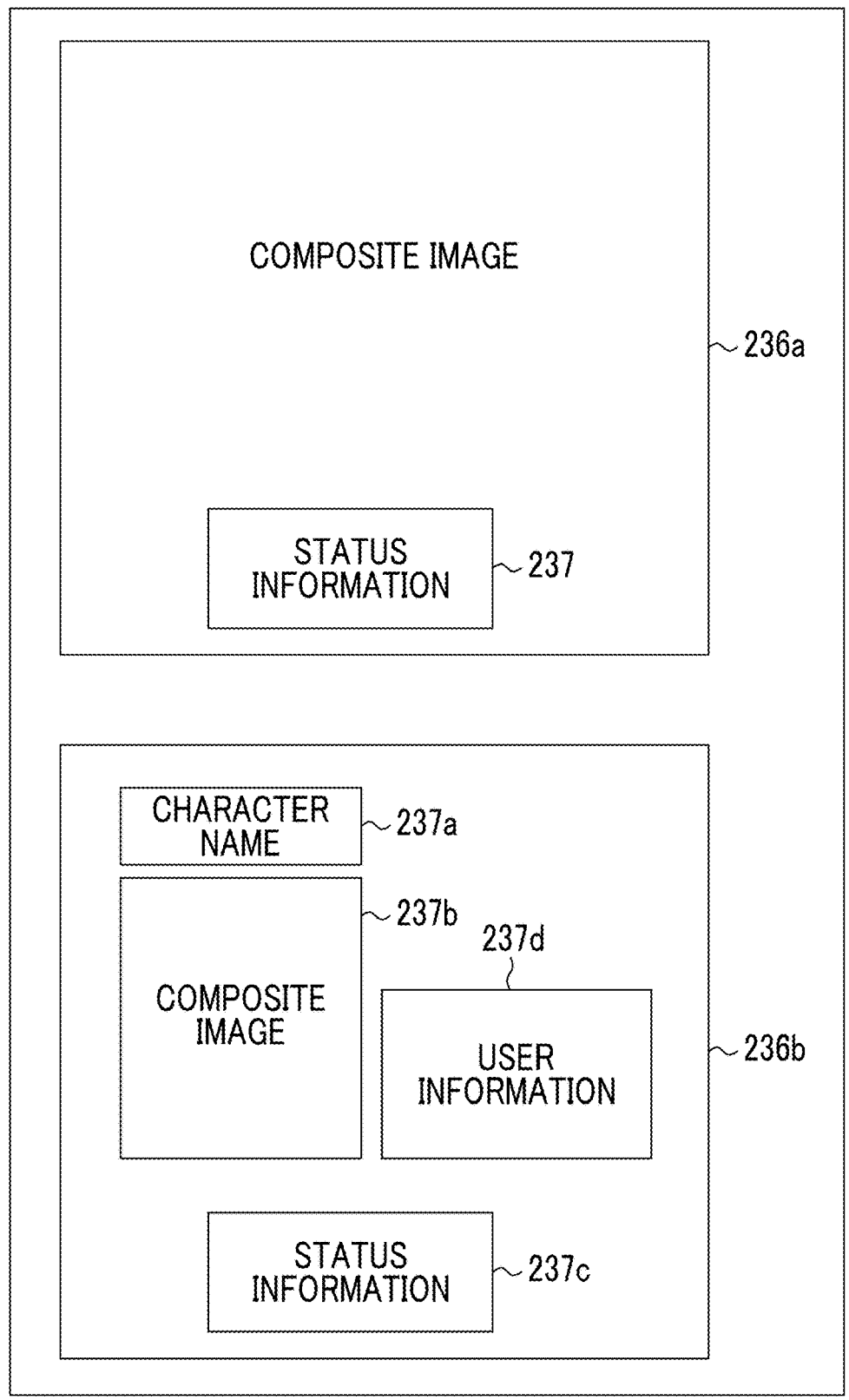
FIG. 6 is a diagram used for describing layout information for arranging print elements in a photo print.

FIG. 6 is a diagram illustrating an example of the layout information 236. In FIG. 6, layout information 236a is layout information for arranging the composite image in the whole photo print and arranging the status information in a region 237 in a lower part of the composite image. Layout information 236b is layout information including a region 237a in which the character name is arranged, a region 237b in which the composite image is arranged, a region 237c in which the status information is arranged, and a region 237d in which user information is arranged. The region 237b is arranged below the region 237a. The region 237d is arranged horizontally next to the region 237b. The region 237d is arranged below the regions 237b and 237d.

The layout information 236 is not limited to the illustration in FIG. 6. Various modification examples are considered. For example, the layout information varies depending on the case of compositing the information including the status information as a text image, the case of compositing as a barcoded code image, or the case of compositing both the text image and the code image, the case of arranging the print elements upright when the photo print is set to be in a vertical direction, the case of arranging the print elements upright when the photo print is set to be in a horizontal direction, and the like. In addition, the layout information is not limited to a case where a plurality of pieces of layout information are prepared. The layout information may be of one type.

The user DB 240 manages personal information related to the user for each user of the smartphone 100 (for each player of the online game).

FIG. 7 is a table illustrating one example of the personal information related to the user managed in the user DB 240.

The user DB 240 illustrated in FIG. 7 manages a password, a name (a real name or a nickname), a skill level of the user (player) for the game, information related to a captured character (a character ID, a capturing date and time, a capturing location, the status information, and the like), and print information (printed information related to the captured character, a print date and time, and the like) using user identification information (user identification (ID)) as a master key.

The user ID, the password, and the name are registered in the user DB 240 at the time of registering the user using the smartphone 100. The skill level and the information related to the captured character are updated and added along with the progress of the game in the online game. In addition, the print information is registered and managed in the case of creating the photo print on which the composite image or the like of the captured image and the CG image of the captured character is printed.

The control unit 210 is a part that manages and controls the server-side communication unit 220, the storage unit 230, the user DB 240, and the like and executes the game application installed on the smartphone 100 by sequentially communicating with the smartphone 100. The control unit 210 mainly includes a game execution unit 212 that reads the game program 232, the game data 234 and the like necessary in the case of executing the game, and the like from the storage unit 230 depending on a play status in the smartphone 100 and executes the online game, and a status information generation unit 214 that generates the status information associated with the character of the game during the online game. The control unit 210 can manage various data necessary for execution and progress of the game and can distribute the data to the smartphone 100.

For example, the online game is considered to be a fighting type online game in which a character such as a monster appears on the screen of the smartphone 100 depending on the position of the smartphone 100 in a real space, and the character is captured by fighting the character and winning. In the case of the online game, the game server 200 causes any character to appear on the screen of the smartphone 100 during the online game in accordance with the positional information received from the smartphone 100 and various parameters such as the skill level of the user (player) of the smartphone 100.

In the smartphone 100 during the online game, the camera unit 142 is driven by the game application. The main control unit 101 functioning as a composite image generation unit generates the composite image in which the captured image (live view image) imaged by the camera unit 142 and the CG image received from the game server 200 and showing the character are composited, and displays the generated composite image on the display panel 121 (display unit) of the smartphone 100.

The player operates the smartphone 100 and captures the character by fighting the character displayed on the display panel 121 and winning.

The game server 200 registers information related to the character captured by the player in the user DB 240 in association with the user ID of the player (refer to FIG. 7).

By doing so, the user can collect the character, and the game server 200 can increase an experience value of the player in response to the collection of the character and increase the skill level of the user depending on the experience value. The game server 200 can change the appearing character and the status information depending on the skill level of the user. For example, as the skill level is increased, the appearance rate of a rare character can be increased, or a score in the status information related to the character can be increased.

In addition, in a case where the smartphone 100 receives the imaging instruction information by operating the operation unit 140 while displaying the composite image of the captured image and the CG image, the smartphone 100 can acquire the composite image displayed on the display unit as a still image. In a case where the main control unit 101 of the smartphone 100 functioning as a print image generation unit receives print instruction information for outputting the composite image acquired as a still image by operating the operation unit 140 as a print, the main control unit 101 generates the print image including the composite image and the information including the status information related to the character in the composite image.

At this point, the main control unit 101 functioning as a layout information acquisition unit and a personal information acquisition unit acquires the layout information from the game server 200 and generates the print image by arranging the print elements such as the composite image, the status information, and the personal information related to the user in accordance with the acquired layout information. In addition, the main control unit 101 generates the print image by converting text information such as the status information and the personal information related to the user into a text image or a barcoded code image. The print image is preferably an image having a layer structure in which the composite image and the text image or the code image are set as images in different layers. The reason is for enabling the text image or the code image to be printed using invisible ink such as infrared ink.

The external input-output unit 160 functioning as an output unit outputs the generated print image to the mobile printer (printer) described below. The mobile printer creates the photo print by printing the print image input from the smartphone 100 on a print medium.

Next, an embodiment in which the status information is changed in accordance with the photo print will be described.

Example 1

In a case where the smartphone 100 receives the print instruction information by operating the operation unit 140, the smartphone 100 transmits the print instruction information and the positional information indicating the position of the smartphone 100 to the game server 200. The positional information indicating the position of the smartphone 100 may be positional information indicating the imaging position (a location where the character appears or is captured) or may be positional information indicating the position of the smartphone 100 at the time of receiving the print instruction information. In a case where the print instruction information is received along with the capturing of the character, both of the positional information match.

In a case where the server-side communication unit 220 receives the print instruction information and the positional information, the status information generation unit 214 of the game server 200 generates the status information or information for changing the status information depending on the received positional information. The status information generated depending on the received positional information is the status information in which a numerical value (for example, a numerical value such as the hit point or the attack point of the character) is increased from that in the current status information. The information for changing the status information is multiplication information for multiplying the numerical value in the current status information by N (N>1) or addition information for adding a numerical value M (M>1) to the numerical value in the current status information.

The status information generation unit 214 of the game server 200 can generate the status information or the information for changing the status information depending on the degree of match between the positional information indicating the received imaging position and the positional information originating from the character corresponding to the CG image included in the composite image. For example, in the case of the horseshoe crab type character, the positional information originating from the character is positional information related to the location where the horseshoe crab lives. Depending on the degree of match between the positional information detected by the GPS reception unit 170 (positional information detection unit) and the positional information originating from the character, the status information generation unit 214 generates new status information having a higher numerical value than the current status information or the information for changing (increasing) the current status information in a case where the degree of match is high.

In addition, the status information generation unit 214 of the game server 200 can generate the status information or the information for changing the status information depending on the degree of match between the positional information indicating the position of the smartphone 100 at the time of receiving the print instruction information and the positional information indicating the imaging position of the captured image. For example, in a case where the imaging location and a location where printing is performed match, new status information having a higher numerical value than the current status information can be generated, or the information for changing (increasing) the current status information can be generated.

Furthermore, the status information generation unit 214 of the game server 200 can generate the status information or the information for changing the status information depending on the degree of match between an attribute of a location related to the received positional information and the attribute of the character corresponding to the CG image included in the composite image. For example, in a case where the attribute of the character is, for example, the water type, and the attribute of the location related to the positional information is a waterfront, the degree of match between both attributes is increased. In this case, new status information having a higher numerical value than the current status information can be generated, or the information for changing (increasing) the current status information can be generated.

Example 2

In a case where the smartphone 100 receives the print instruction information, the smartphone 100 transmits information indicating an elapsed time from the imaging of the captured image until the reception of the print instruction information to the game server 200.

In a case where the game server 200 receives the print instruction information and the information indicating the elapsed time from the smartphone 100, the status information generation unit 214 generates the status information or the information for changing the status information depending on the received information indicating the elapsed time. For example, as the elapsed time from the imaging of the captured image until the reception of the print instruction information is increased, the attachment to the captured character is considered to be stronger. Thus, the status information generation unit 214 can generate new status information having a higher numerical value than the current status information or can generate the information for changing (increasing) the current status information.

Example 3

The smartphone 100 comprises the positional information detection unit (GPS reception unit 170) detecting the positional information indicating the imaging position of the captured image, and the azimuthal information detection unit (the electronic compass and the motion sensor unit 180) detecting the azimuthal information indicating the imaging direction. In a case where the smartphone 100 receives the print instruction information, the smartphone 100 transmits the print instruction information, the positional information acquired by the positional information detection unit, and the azimuthal information detected by the azimuthal information detection unit to the game server 200.

In a case where the server-side communication unit 220 (imaging information acquisition unit) receives the print instruction information, the positional information, and the azimuthal information, the status information generation unit 214 calculates an imaging range of the smartphone 100 based on the received positional information and the azimuthal information and generates the status information or the information for changing the status information depending on a subject in the calculated imaging range. The game server 200 can calculate the imaging range of the smartphone 100 based on the received positional information and the azimuthal information and can find what kind of subject (a heritage site, a tourist attraction, a landmark, or the like) is present in the calculated imaging range. The status information generation unit 214 can generate new status information or the information for changing the current status information depending on the subject in the imaging range.

<Print Method>

First Embodiment

Figure 8:
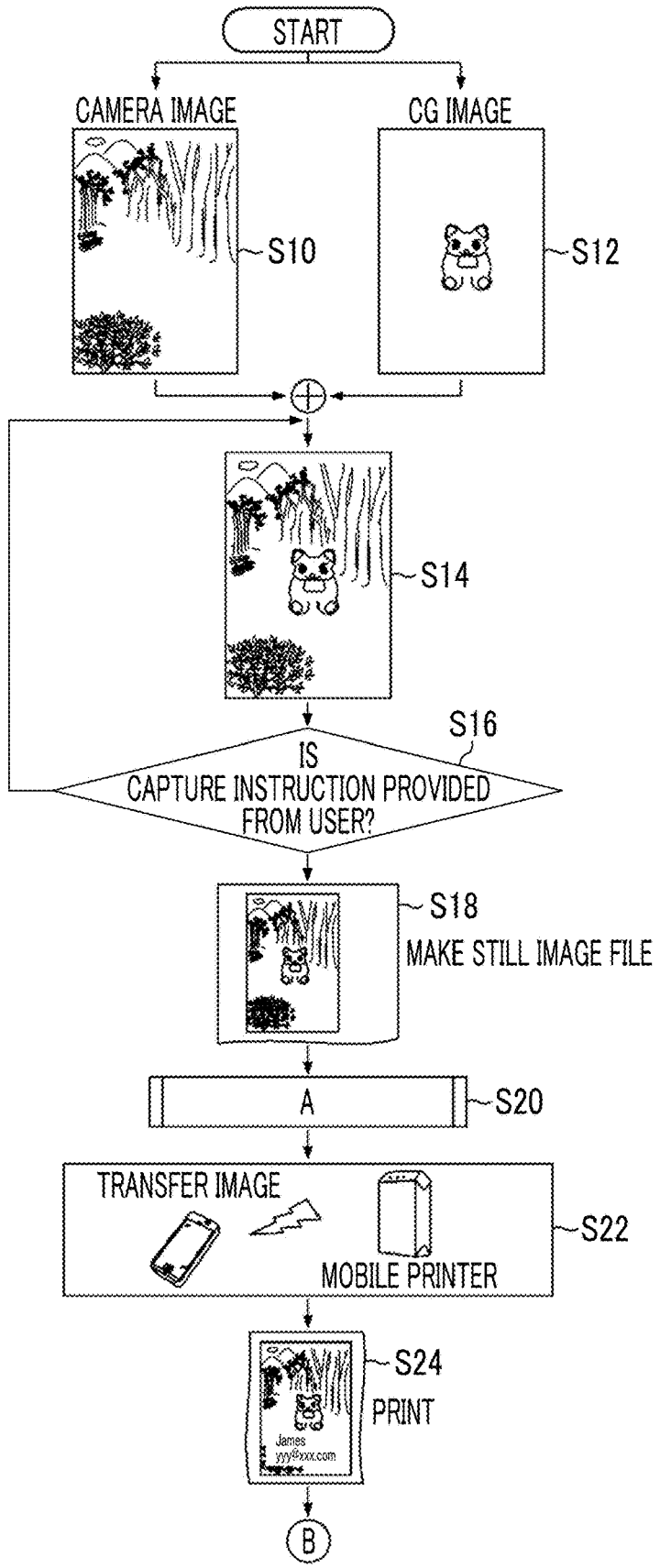
FIG. 8 is a flowchart illustrating a first embodiment of a print method applied to the game system.

FIG. 8 is a flowchart illustrating a first embodiment of the print method applied to the game system.

The print method applied to the print system is performed by causing the smartphone 100 to execute the game application.

In FIG. 8, by executing the game application, the smartphone 100 can communicate with the game server 200 and perform the online game. The game application performs imaging by the camera unit 142 of the smartphone 100 and displays the captured image (live view image) on the display and input unit 120 of the smartphone 100 (step S10).

The game application acquires information such as the GPS information from the smartphone 100, information related to the motion of the smartphone 100 from the motion sensor unit 180 and the electronic compass, and the imaging direction. Based on the information, the game application acquires the CG image showing the virtual object of the game (for example, the character of the game) from the game server 200 (step S12) and composites the captured image with the CG image (step S14). In this case, the main control unit 101 executing the game application functions as a computer graphics image acquisition unit that acquires the CG image, and the composite image generation unit that generates the composite image in which the captured image and the CG image are composited. In addition, the captured image and the CG image can be relatively moved using information related to the direction of the smartphone 100 (the imaging direction of the camera unit 142).

The composite image in which the captured image and the CG image are composited is displayed on the display and input unit 120 (display unit) (step S14).

Next, a determination as to whether or not capture instruction information (imaging instruction information) is input by a touch operation of the user performed on the display and input unit 120 is performed (step S16). In a case where the imaging instruction information is received, the main control unit 101 functioning as a composite image acquisition unit acquires the composite image displayed on the display and input unit 120 as a still image and retains the acquired still image in the storage unit 150 as a still image file (step S18).

Then, in a case where the print instruction information is received by a touch operation of the user performed on the display and input unit 120 in a state where the still image file is read from the storage unit 150 or the captured still image is displayed on the display and input unit 120, a transition is made to step S20 in which a process of embedding necessary information in the still image is performed.

Figure 9:
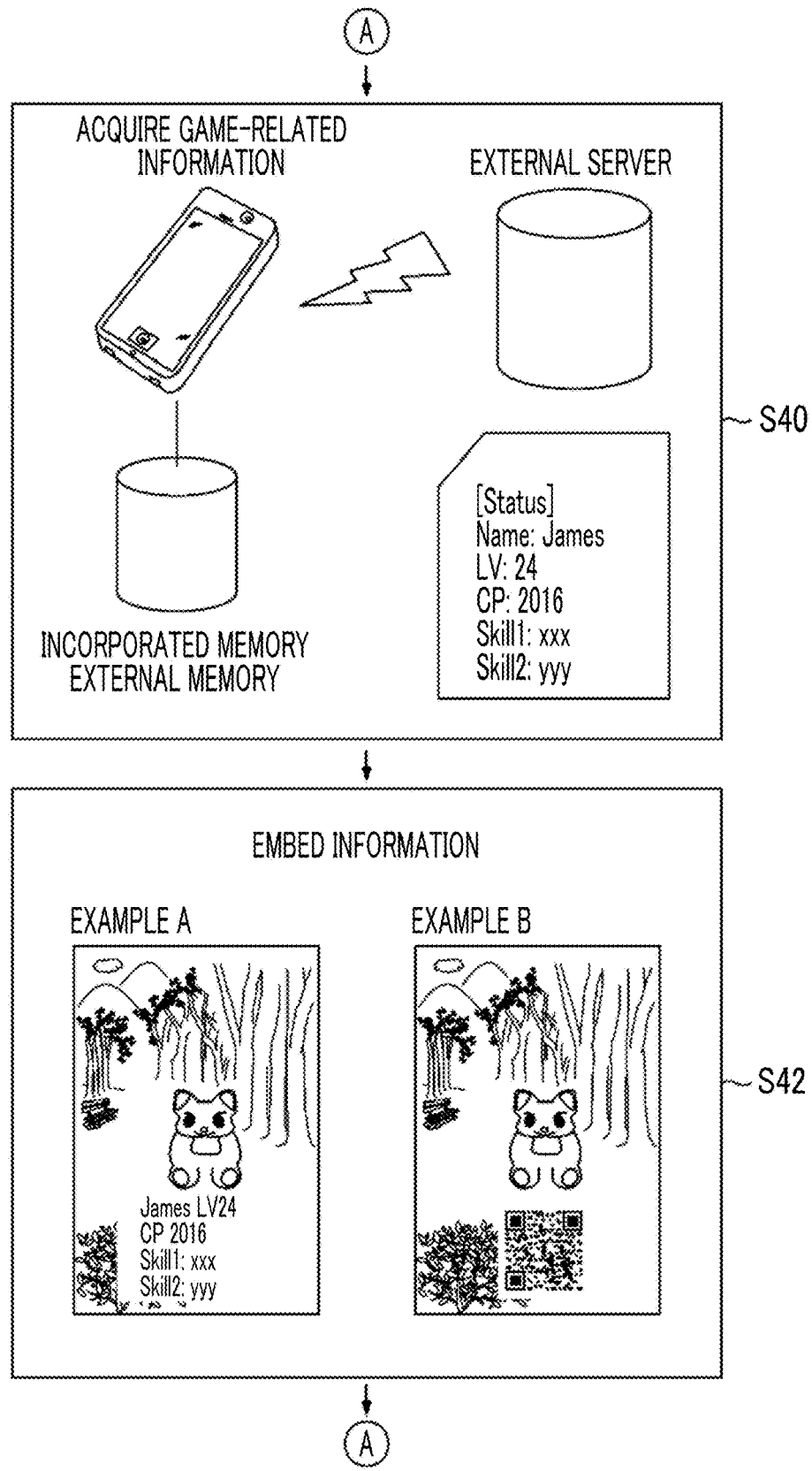
FIG. 9 is a flowchart illustrating an embodiment of an information embedding process in step S20 illustrated in FIG. 8.

FIG. 9 is a flowchart illustrating an embodiment of the information embedding process in step S20 illustrated in FIG. 8.

As illustrated in FIG. 9, in a case where the print instruction information is received, the main control unit 101 functioning as an information embedding unit acquires game-related information (the status information related to the character of the game in the composite image) and the personal information related to the user of the smartphone 100 from the storage unit 150 (the internal storage unit 151 or the external storage unit 152) of the smartphone 100 or an external server (for example, the game server 200) (step S40). The personal information related to the user is not limited to the personal information retained in advance in the storage unit 150 or the like or the personal information managed in the user DB 240 of the game server 200. The user may input the personal information before printing.

The main control unit 101 embeds the acquired status information and the personal information related to the user in the composite image (still image) in which the CG image is composited (step S42). The embedded status information and the personal information related to the user may be embedded by converting the text information into a text image or may be embedded by converting the text information into a barcoded (including a two-dimensional barcode) code image.

The case of acquiring the layout information 236*a* illustrated in FIG. 6 and embedding the text image or the code image in the composite image in accordance with the acquired layout information 236*a* is not for limitation purposes. The layout information 236*b* illustrated in FIG. 6 may be acquired, and the print image may be generated by arranging the composite image and the text image or the code image in accordance with the acquired layout information 236*b*.

Returning to FIG. 8, the still image in which the status information and the personal information are embedded is output to the mobile printer from the wireless communication unit 110 or the external input-output unit 160 of the smartphone 100 (step S22), and the photo print is printed (step S24). The still image in which the status information and the personal information are embedded may be transmitted (output) to the print server 310 from the smartphone 100 through the network 330 or to the print server 310 through the game server 200. The photo print may be printed in the print server 310.

Figure 10:
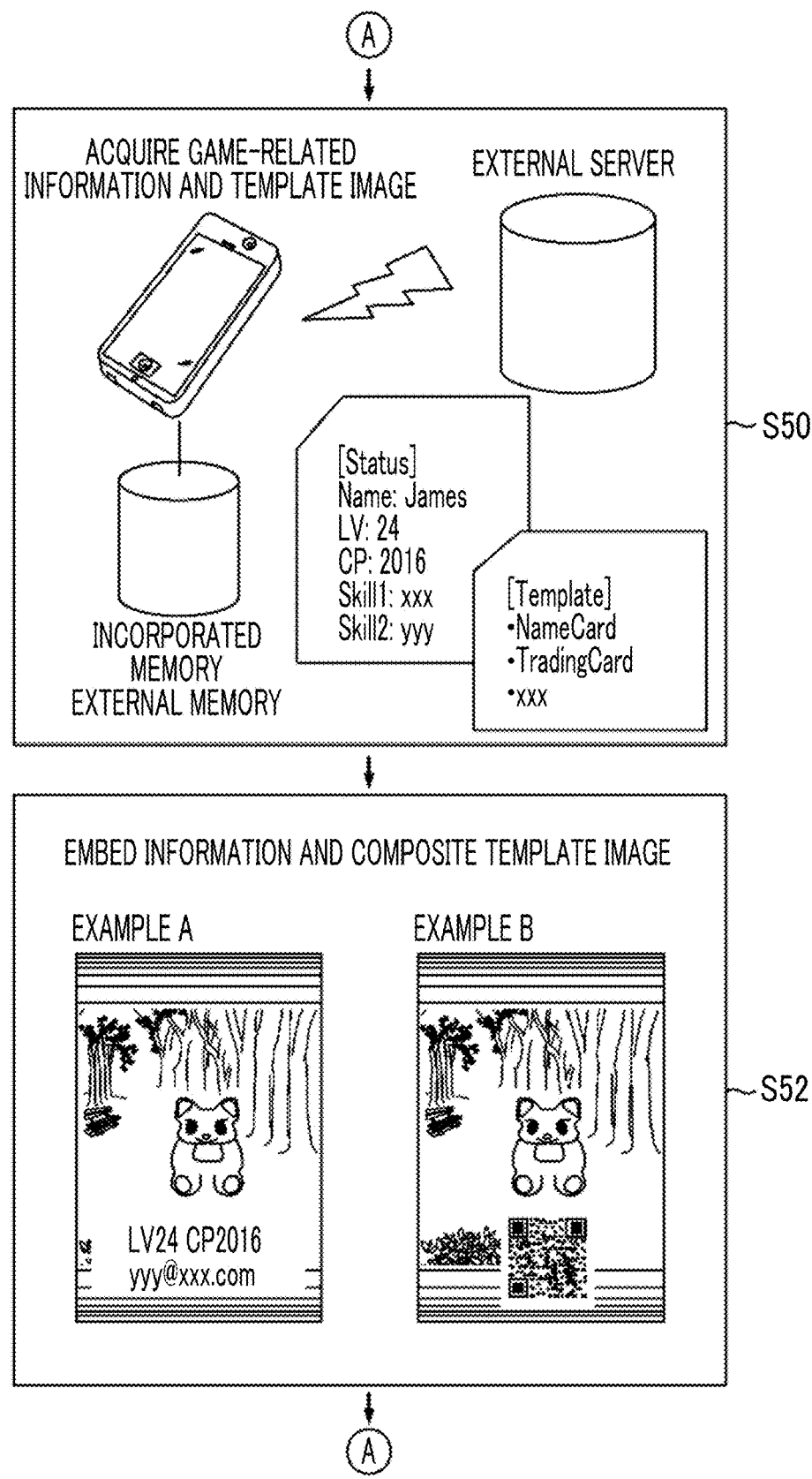
FIG. 10 is a flowchart illustrating another embodiment of the information embedding process in step S20 illustrated in FIG. 8.

FIG. 10 is a flowchart illustrating another embodiment of the information embedding process in step S20 illustrated in FIG. 8.

As illustrated in FIG. 10, in a case where the print instruction information is received, the main control unit 101 acquires the game-related information (the status information related to the character of the game in the composite image), the personal information related to the user of the smartphone 100, and a template image from the storage unit 150 (the internal storage unit 151 or the external storage unit 152) of the smartphone 100 or the external server (for example, the game server 200) (step S50).

The main control unit 101 embeds the acquired status information and the personal information related to the user in the composite image (still image) in which the CG image is composited, and composites the still image with the template image (step S52). The template image may be called by the game application or may be appropriately called by the user from the storage unit 150 or the external server. In this case, the main control unit 101 executing the game application functions as a template image acquisition unit that acquires the template image, and an image compositing unit that composites the template image with the CG image.

[Method of Using Photo Print]

Next, a method of using the photo print such as the still image in which necessary information such as the status information and the personal information is embedded will be described.

Figure 11:
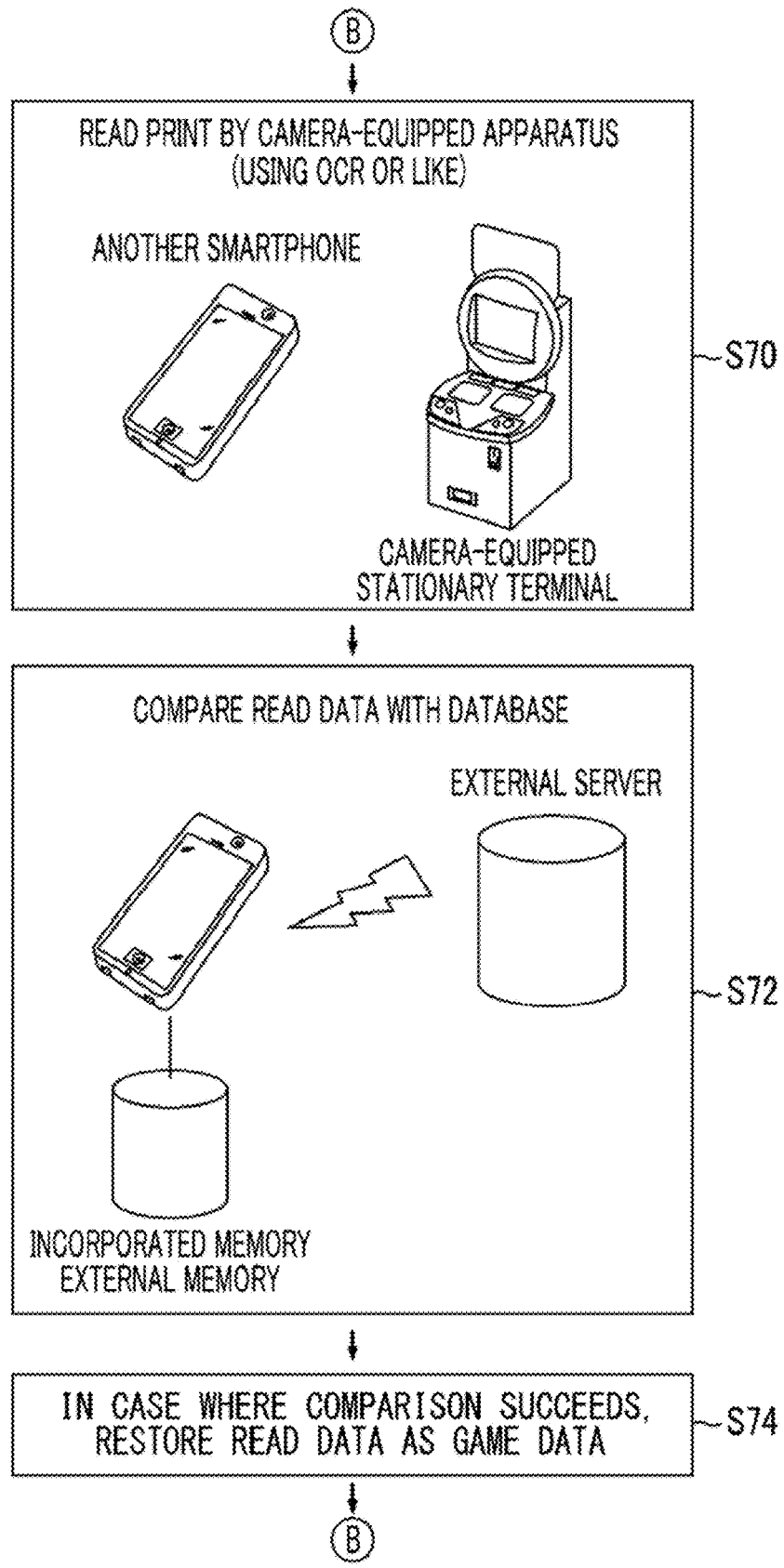
FIG. 11 is a diagram used for describing a method of using the photo print output as a print according to the embodiment of the present invention.

As illustrated in FIG. 11, the information embedded in the photo print is read by a camera-equipped apparatus, another smartphone, or a camera-equipped stationary terminal (step S70). In a case where the information is embedded as a text image, the information is read by recognizing the text using an optical character reader (OCR). In a case where the information is embedded as a barcode, the information is read by a barcode reader.

The read information (data) is transmitted to the game server 200. The game server 200 compares the received data with data registered in the user DB 240 (step S72). In a case where the comparison succeeds, the game data can be inherited (step S74).

In addition, the photo print in which the status information related to the character is added to the composite image in which the captured image and the CG image of the character of the game are composited is an independent photo print suitable for communication for the player of the online game and can also be used for a trading card game.

<Printer>

Figure 12:
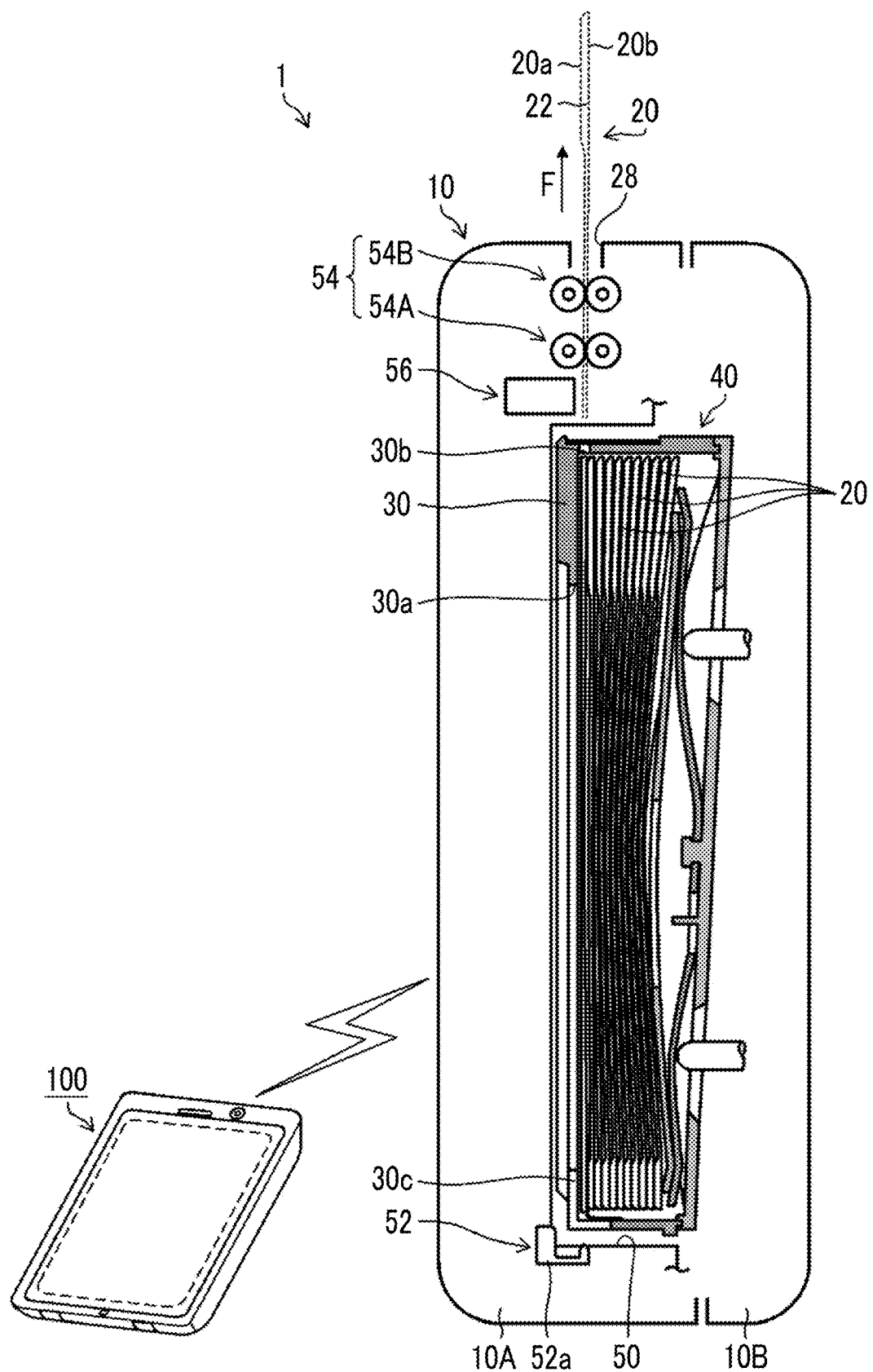
FIG. 12 is a diagram illustrating an internal mechanical configuration of a mobile printer.

FIG. 12 is a diagram illustrating an internal mechanical configuration of the mobile printer. FIG. 12 illustrates only a main configuration.

A mobile printer 1 illustrated in FIG. 12 uses an instant film 20 as the print medium and comprises an instant film pack 40, a film loading chamber 50, a film feed mechanism 52, a film transport mechanism 54, and a print head 56.

The instant film pack 40 has a structure in which a plurality of instant films 20 are accommodated in a case 30.

Figure 13:
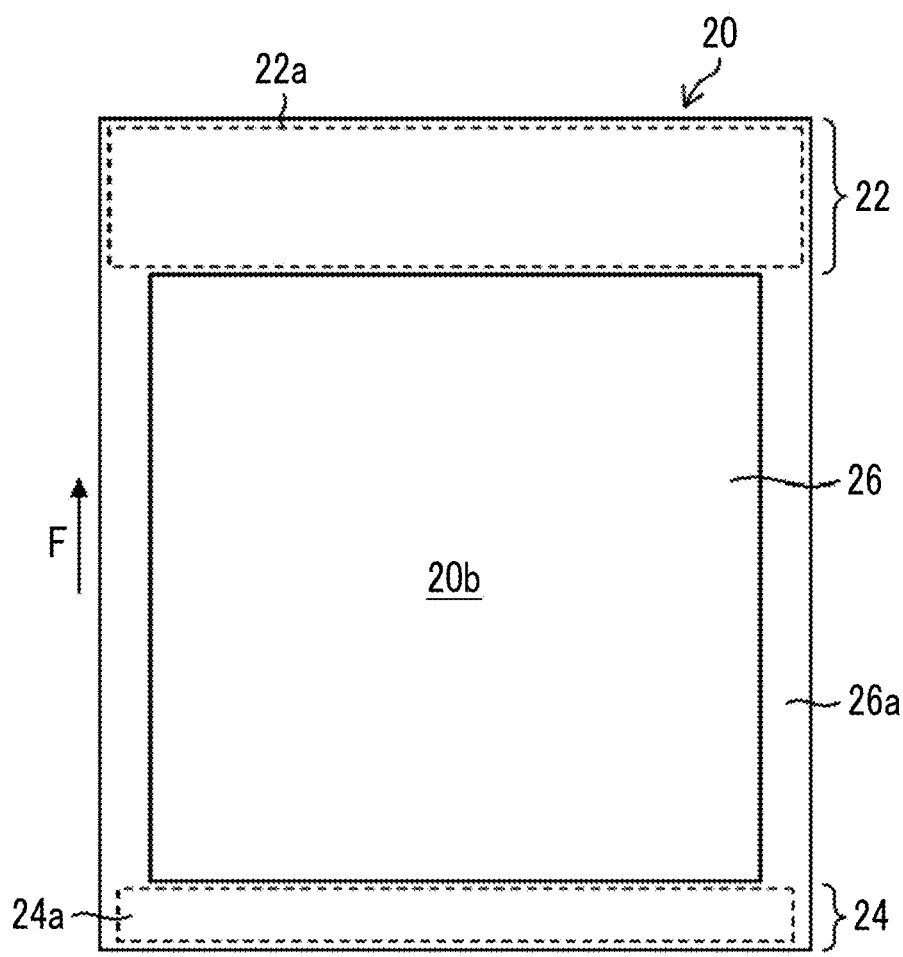
FIG. 13 is a diagram illustrating a first embodiment of a print medium used in the mobile printer illustrated in FIG. 11.

FIG. 13 is a front view of the instant film 20.

In FIG. 13, a direction denoted by arrow F is a direction of use of the instant film 20. That is, the instant film 20 is fed in the direction denoted by arrow F, and the instant film 20 is used. Accordingly, in a case where the instant film 20 is loaded in the mobile printer 1, the direction denoted by arrow F is a discharge direction of the instant film 20.

The instant film 20 has a shape of a rectangular card. The instant film 20 is configured with a light exposure surface 20*a* (FIG. 12) on its rear surface side and an observation surface 20*b* on its front surface side. The light exposure surface 20*a* is a surface on which an image is printed (recorded) by light exposure. The observation surface 20*b* is a surface on which the printed image is observed.

In the instant film 20, a pod portion 22 and a trap portion 24 are disposed with a light exposure portion interposed therebetween. The image is printed by light exposure in the light exposure portion.

The pod portion 22 is arranged on the front side of the light exposure portion in the direction of use F. The pod portion 22 incorporates a developing treatment liquid pod 22*a* containing developing treatment liquid.

The trap portion 24 is arranged on the rear side of the light exposure portion in the direction of use F. The trap portion 24 incorporates an absorbing material 24*a*.

In FIG. 13, an observation portion 26 is comprised on the observation surface 20*b* of the instant film 20. The observation portion 26 is a part in which the image is displayed. By performing a development process on the light exposure portion, the image is displayed on the observation portion 26. The observation portion 26 is arranged in correspondence with the light exposure portion. A frame 26*a* is comprised around the observation portion 26. Accordingly, the image is displayed within the frame.

The instant film 20 is viewed in a direction in which the trap portion 24 is the top and the pod portion 22 is the bottom. Accordingly, the image is printed in the direction in which the trap portion 24 is the top and the pod portion 22 is the bottom.

The instant film 20 is subjected to a development process by applying the developing treatment liquid in the pod portion 22 to the light exposure portion after light exposure. The developing treatment liquid in the pod portion 22 is squeezed from the pod portion 22 and applied to the light exposure portion by passing the instant film 20 between a roller pair. Remaining developing treatment liquid at the time of the application process is captured in the trap portion 24.

The case 30 of the instant film pack 40 illustrated in FIG. 12 has a shape of a rectangular box. The case 30 includes an opening portion 30a for light exposure in its front surface part and a slit-shaped discharge port 30b in its upper surface part. The instant film 20 is accommodated in a piled manner in the case with the light exposure surface 20a directed to the front surface side of the case 30 and the pod portion 22 directed toward the upper surface side of the case 30.

In addition, the case 30 includes a slit-shaped claw opening portion 30c in its bottom surface part. The instant film 20 accommodated in the case 30 is fed toward the discharge port 30b and discharged from the discharge port 30b one sheet at a time by causing a claw to enter from the claw opening portion 30c. A print discharge port 28 is comprised at the center in the width direction of the upper surface of a printer main body 10 as a slit through which the instant film can pass. The instant film 20 is discharged directly upward from the print discharge port 28.

One instant film pack 40 accommodates 10 instant films 20.

The film loading chamber 50 is comprised in a main body portion 10A of the printer main body 10 as a recessed portion in which the instant film pack 40 can be accommodated. In a case where a rear cover portion 10B of the printer main body 10 is open, the film loading chamber 50 is exposed, and the instant film pack 40 can be loaded.

The film feed mechanism 52 feeds the instant film 20 one sheet at a time from the instant film pack 40 loaded in the film loading chamber 50. The film feed mechanism 52 comprises a claw 52a that moves forward and rearward in a feed direction of the instant film 20. The instant film 20 in the case is withdrawn one sheet at a time by the claw 52a, and the instant film 20 is fed from the instant film pack 40.

The film transport mechanism 54 transports the instant film 20 fed from the instant film pack 40 by the film feed mechanism 52 at a constant speed. The film transport mechanism 54 comprises a transport roller pair 54A and an application roller pair 54B.

The transport roller pair 54A rotates by driving the transport roller pair 54A by a motor, not illustrated, and transports the instant film 20 by sandwiching both sides of the instant film 20.

The application roller pair 54B rotates by driving the application roller pair 54B by a motor, not illustrated, and transports the instant film 20 by sandwiching the whole instant film 20. During the course of transport, a process of applying the developing treatment liquid is performed by pressing and breaking the pod portion 22 of the instant film 20.

The print head 56 is driven based on the image data of the print image and prints the image on the instant film 20 fed from the instant film pack 40. The print head 56 is configured with a line type light exposure head. The print head 56 radiates print light one line at a time to the light exposure surface 20a of the instant film 20 transported by the film transport mechanism 54 and prints the image on the instant film 20 in one pass.

The mobile printer 1 comprises a short range wireless communication unit (not illustrated) and can receive the print image data with the external device by wireless communication.

Accordingly, by receiving the image data of the print image from the external input-output unit 160 or the wireless communication unit 110 of the smartphone 100 as illustrated in FIG. 12, the mobile printer 1 can print the image on the instant film 20.

Second Embodiment of Game Server

Figure 14:
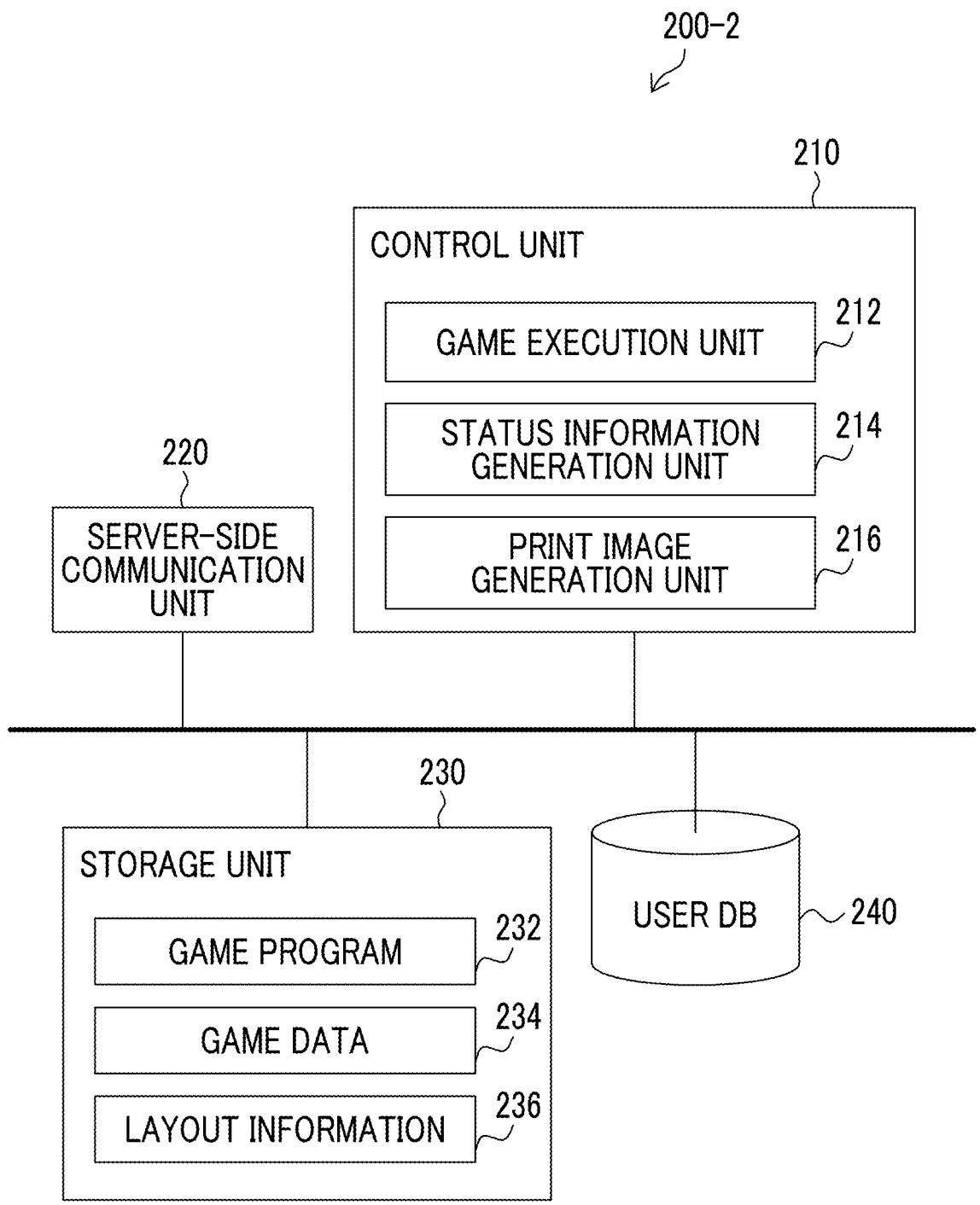
FIG. 14 is a block diagram illustrating a second embodiment of the game server applied to the game system illustrated in FIG. 1.

FIG. 14 is a block diagram illustrating a second embodiment of the game server applied to the game system illustrated in FIG. 1. In FIG. 14, common parts in the first embodiment illustrated in FIG. 5 will be designated by the same reference signs, and detailed description of such parts will not be repeated.

A game server 200-2 of the second embodiment is mainly different from the game server 200 of the first embodiment in that the control unit 210 comprises a print image generation unit 216.

That is, while the smartphone 100 generates the print image in the print system including the game server 200 of the first embodiment and the smartphone 100, the print image generation unit 216 on the server side generates the final print image in the game server 200-2 of the second embodiment.

In a case where the server-side communication unit 220 receives the composite image in which the captured image imaged by the smartphone 100 and the CG image are composited, and the print instruction information indicating an instruction to print the composite image, the print image generation unit 216 generates the print image including the composite image and the information including the status information.

The status information to be composited with the composite image is generated in the status information generation unit 214. Thus, the status information generated by the status information generation unit 214 can be used. In addition, the print image generation unit 216 may composite the personal information related to the user with the composite image in addition to the status information. In this case, since the personal information related to the user is managed by the user DB 240, the personal information can be used.

The print image generated by the game server 200-2 (print image generation unit 216) can be transmitted to the smartphone 100 or the printer (print server 310) through the network 330.

Third Embodiment of Game Server

Figure 15:
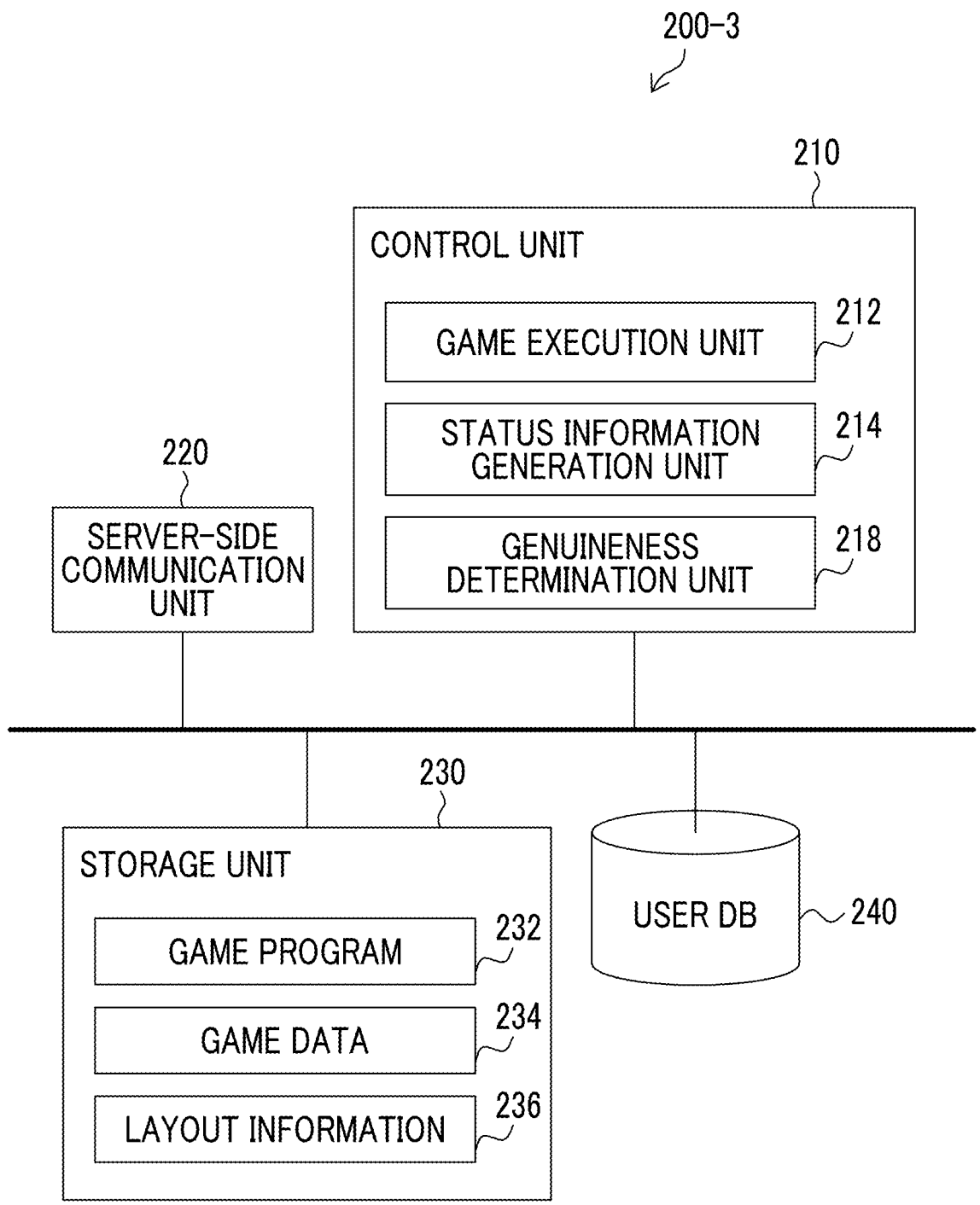
FIG. 15 is a block diagram illustrating a third embodiment of the game server applied to the game system illustrated in FIG. 1.

FIG. 15 is a block diagram illustrating a third embodiment of the game server applied to the game system illustrated in FIG. 1. In FIG. 15, common parts in the first embodiment illustrated in FIG. 5 will be designated by the same reference signs, and detailed description of such parts will not be repeated.

A game server 200-3 of the third embodiment is mainly different from the game server 200 of the first embodiment in that the control unit 210 comprises a genuineness determination unit 218.

The genuineness determination unit 218 is a part that determines the genuineness of the photo print in response to a request from the user and notifies the user of the determination result.

Figure 16:
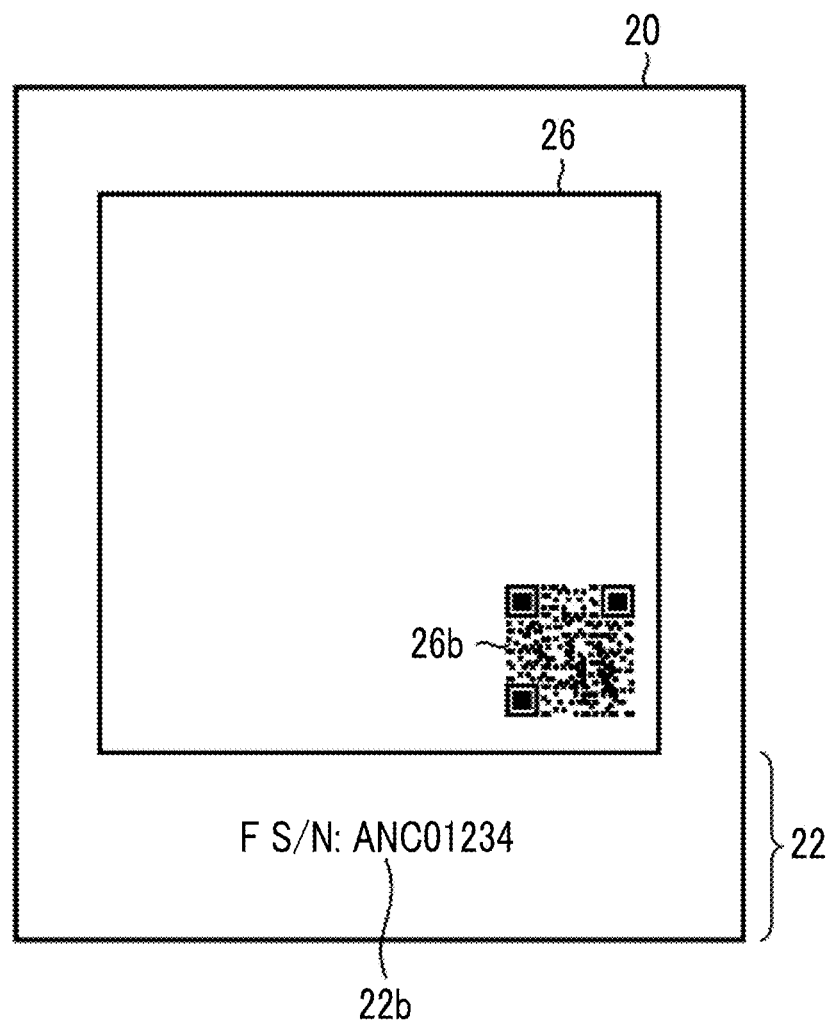
FIG. 16 is a diagram illustrating a second embodiment of the print medium used in the mobile printer.

The instant film 20 illustrated in FIG. 16 is used as the print medium of the photo print used in the determination of genuineness. In the instant film 20, a margin region (particularly, the pod portion 22) is disposed around the observation portion 26. Print identification information (serial number) 22b is printed in advance in the margin region using infrared ink.

The composite image of the captured image and the CG image of the character, the status information related to the character, and the personal information related to the user are printed in the observation portion 26. A code image 26b includes the status information including character identification information (serial number) and the personal information related to the user.

In a case where the user creates a valid photo print, the serial number of the character and the serial number 22b of the instant film 20 in addition to the personal information related to the user are read from the photo print and registered in the user DB 240 of the game server 200-3 by the smartphone 100. In this case, the smartphone 100 reads the serial number 22b of the instant film 20 by emitting infrared light from the LED light 144 and performing infrared imaging by the camera unit 142.

The genuineness determination unit 218 compares the personal information, the serial number of the character, and the serial number 22b of the instant film 20 read from the photo print with information registered in the user DB 240 (database). In a case where matching information is not present in the database, the genuineness determination unit 218 determines that the photo print is genuine. In a case where matching information is present in the database, the genuineness determination unit 218 determines that the photo print from which information is read is fake.

The serial number that uniquely specifies the print medium (instant film 20) is printed on the photo print. Thus, even in a case where the personal information and the serial number of the character printed on the photo print are duplicated by invalid replication, the genuineness of the photo print can be determined based on the serial number of the instant film 20. In a case where the personal information and the serial number of the character printed on the photo print are not registered in the user DB 240, it is determined that the photo print is genuine, and the serial number of the instant film 20 is registered in the user DB 240 along with the personal information and the serial number of the character.

[Others]

The print system of the present embodiment is not limited to the illustrations. The present invention can also be applied to other configurations. Each functional configuration can be appropriately implemented by any hardware, software, or a combination of both hardware and software. For example, the present invention can be applied to a program causing a computer to execute the process of each unit of the print system described above and a computer-readable recording medium (non-transitory recording medium) on which the program is recorded.

In addition, in the present embodiment, a hardware structure of a processing unit executing various processes like the main control unit 101 of the smartphone 100 and the game execution unit 212, the status information generation unit 214, and the print image generation unit 216 of the game server 200 includes various processors described as follows. Various processors include a central processing unit (CPU) that is a general-purpose processor functioning as various processing units by executing software (program), a programmable logic device (PLD) such as a field programmable gate array (FPGA) that is a processor capable of changing a circuit configuration after manufacturing, a dedicated electric circuit such as an application specific integrated circuit (ASIC) that is a processor having a circuit configuration dedicatedly designed to execute a specific process, and the like.

One processing unit may be configured with one of the various processors or may be configured with two or more processors (for example, a plurality of FPGAs or a combination of a CPU and an FPGA) of the same type or different types. In addition, a plurality of processing units may be configured with one processor. A first example of configuring a plurality of processing units with one processor is such that one processor is configured with a combination of one or more CPUs and software, and the processor functions as the plurality of processing units, as represented by a computer such as a client or a server. A second example is such that a processor that implements the function of the whole system including the plurality of processing units using one integrated circuit (IC) chip is used, as represented by a system on chip (SoC) or the like. Various processing units are configured using one or more of the various processors as the hardware structure.

Furthermore, the hardware structure of the various processors is more specifically an electric circuit (circuitry) in which circuit elements such as semiconductor elements are combined.

In addition, the printer of the present embodiment is not limited to the mobile printer illustrated in FIG. 12, and various printers can be used. In addition, the print medium is not limited to the instant film 20.

In addition, the composite image in which the captured image and the CG image of the character are composited may be printed using typical visible ink, and the information embedded in the composite image may be printed using invisible ink. The invisible ink includes not only the infrared ink but also ink that exhibits fluorescence by an ultraviolet ray, ink that is visible by heat, and the like.

Furthermore, the present invention is not limited to the embodiments described above. Various modifications can be made without departing from the spirit of the present invention.

EXPLANATION OF REFERENCES

1: mobile printer
10: printer main body
10A: main body portion
10B: rear cover portion
20: instant film
20a: light exposure surface
20b: observation surface
22: pod portion
22a: developing treatment liquid pod
22b: serial number
24: trap portion
24a: absorbing material
26: observation portion
26a: frame
26b: code image
28: print discharge port
30: case
30a: opening portion
30b: discharge port
30c: claw opening portion
40: instant film pack
50: film loading chamber
52: film feed mechanism
52a: claw
54: film transport mechanism 54A: transport roller pair
54B: application roller pair
56: print head
100: camera-equipped information terminal (smartphone)
101: main control unit
102: casing
110: wireless communication unit
120: display and input unit
121: display panel
122: operation panel
130: call unit
131: speaker
132: microphone
140: operation unit
141, 142: camera unit
144: LED light
150: storage unit
151: internal storage unit
152: external storage unit
160: external input-output unit
170: GPS reception unit
180: motion sensor unit
190: power supply unit
200: game server
200-2: game server
200-3: game server
210: control unit
212: game execution unit
214: status information generation unit
216: print image generation unit
218: genuineness determination unit
220: server-side communication unit
230: storage unit
232: game program
234: game data
236, 236a, 236b: layout information
237, 237a, 237b, 237c, 237d: region
310: print server
320: camera-equipped stationary terminal
330: network
240: user DB
S10 to S74: step

What is claimed is:

1. A print system applied to a game system that includes a server and a camera-equipped portable terminal communicating with each other through a network and provides an online game through the network,
wherein the server includes
a status information generation unit that generates status information related to a character of the game during the online game, and
a server-side communication unit that transmits a computer graphics image showing the character and the status information to the camera-equipped portable terminal during the online game, and
the camera-equipped portable terminal includes
an imaging unit,
a terminal-side communication unit that receives the computer graphics image and the status information from the server,
a composite image generation unit that generates a composite image in which a captured image imaged by the imaging unit and the received computer graphics image are composited,
a display unit that displays the generated composite image,
a composite image acquisition unit that acquires the composite image displayed on the display unit in a case where imaging instruction information is received,
a print image generation unit that generates a print image including the acquired composite image and information including the received status information in a case where print instruction information is received, and
an output unit that outputs the print image generated by the print image generation unit to a printer.

2. The print system according to claim 1,
wherein the camera-equipped portable terminal includes a personal information acquisition unit that acquires personal information related to a user, and
the print image generation unit generates the print image by compositing the received status information and the acquired personal information related to the user with the composite image.

3. The print system according to claim 1,
wherein the print image generation unit generates the print image by compositing the composite image with a text image or a barcoded code image showing the information including the status information.

4. The print system according to claim 1, further comprising:
a printer that creates a photo print by printing the print image output from the output unit on a print medium, the printer printing the composite image in the print image using visible ink and printing the text image or the barcoded code image showing the information including the status information using invisible ink.

5. The print system according to claim 4,
wherein the camera-equipped portable terminal includes an imaging unit imaging the text image or the code image printed using the invisible ink and acquires the information including the status information based on the text image or the code image imaged by the imaging unit.

6. The print system according to claim 1,
wherein the camera-equipped portable terminal includes a layout information acquisition unit that acquires layout information for arranging a print element including the composite image and the information including the status information in a photo print, and
the print image generation unit generates the print image in which the composite image and the information including the status information are arranged in accordance with the layout information acquired by the layout information acquisition unit.

7. The print system according to claim 1,
wherein the camera-equipped portable terminal includes a positional information detection unit detecting positional information indicating a position of the camera-equipped portable terminal and transmits the print instruction information and the positional information detected by the positional information detection unit to the server from the terminal-side communication unit in a case where the print instruction information is received,
the status information generation unit generates the status information or information for changing the status information depending on the received positional information in a case where the server-side communication unit receives the print instruction information and the positional information, and the server-side communication unit transmits the generated status information or the information for changing the status information to the camera-equipped portable terminal.

8. The print system according to claim 7,
wherein the status information generation unit generates the status information or the information for changing the status information depending on a degree of match between the received positional information and positional information originating from the character corresponding to the computer graphics image included in the composite image, a degree of match between the positional information indicating the position of the camera-equipped portable terminal at a time of receiving the print instruction information and positional information indicating an imaging position of the captured image, or a degree of match between an attribute of a location related to the received positional information and an attribute of the character corresponding to the computer graphics image included in the composite image.

9. The print system according to claim 1,
wherein the camera-equipped portable terminal transmits information indicating an elapsed time from imaging of the captured image until reception of the print instruction information to the server from the terminal-side communication unit in a case where the print instruction information is received, and
in a case where the server-side communication unit receives the print instruction information and the information indicating the elapsed time, the status information generation unit generates the status information or information for changing the status information depending on the received information indicating the elapsed time.

10. The print system according to claim 1,
wherein the camera-equipped portable terminal includes a positional information detection unit detecting positional information indicating an imaging position of the captured image and an azimuthal information detection unit detecting azimuthal information indicating an imaging direction and transmits the print instruction information, the positional information detected by the positional information detection unit, and the azimuthal information detected by the azimuthal information detection unit to the server from the terminal-side communication unit in a case where the print instruction information is received, and
in a case where the server-side communication unit receives the print instruction information, the positional information, and the azimuthal information, the status information generation unit calculates an imaging range of the camera-equipped portable terminal based on the received positional information and the azimuthal information and generates the status information or information for changing the status information depending on a subject in the calculated imaging range.

11. A server constituting the print system according to claim 7.

12. A server communicating with a camera-equipped portable terminal of a user through a network and providing an online game, the server comprising:
a status information generation unit that generates status information related to a character of the game during the online game;
a server-side communication unit that transmits a computer graphics image showing the character and the status information to the camera-equipped portable terminal during the online game and receives a composite image in which a captured image imaged by the camera-equipped portable terminal and the computer graphics image are composited, and print instruction information indicating an instruction to print the composite image; and
a print image generation unit that generates a print image including the composite image and information including the status information in a case where the server-side communication unit receives the print instruction information,
wherein the server-side communication unit transmits the generated print image to the camera-equipped portable terminal or a printer.

13. The server according to claim 12, further comprising:
a database that manages personal information related to the user of the camera-equipped portable terminal,
wherein the print image generation unit generates the print image including the composite image, the status information, and the personal information related to the user and acquired from the database.

14. The server according to claim 12,
wherein the print image generation unit generates the print image in which the composite image and a text image or a barcoded code image showing the information including the status information are composited.

15. The server according to claim 12, further comprising:
a layout information acquisition unit that acquires layout information for arranging a print element including the composite image and the information including the status information in a photo print,
wherein the print image generation unit generates the print image in which the composite image and the information including the status information are arranged in accordance with the layout information acquired by the layout information acquisition unit.

16. The server according to claim 12, further comprising:
a positional information acquisition unit that acquires positional information indicating an imaging position of the captured image imaged by the camera-equipped portable terminal,
wherein the status information generation unit generates the status information depending on the acquired positional information.

17. The server according to claim 16,
wherein the status information generation unit generates the status information depending on a degree of match between the acquired positional information and positional information originating from the character corresponding to the computer graphics image included in the composite image, a degree of match between the positional information indicating a position of the camera-equipped portable terminal at a time of receiving the print instruction information and the positional information indicating the imaging position of the captured image, or a degree of match between an attribute of a location related to the acquired positional information and an attribute of the character corresponding to the computer graphics image included in the composite image.

18. The server according to claim 12,
wherein the status information generation unit generates the status information depending on an elapsed time from imaging of the captured image until reception of the print instruction information.

19. The server according to claim 12, further comprising:
an imaging information acquisition unit that acquires positional information indicating an imaging position of the captured image imaged by the camera-equipped portable terminal and azimuthal information indicating an imaging direction,
wherein the status information generation unit calculates an imaging range of the camera-equipped portable terminal based on the acquired positional information and the azimuthal information and generates the status information depending on a subject in the calculated imaging range.

20. A print method applied to a game system that includes a server and a camera-equipped portable terminal communicating with each other through a network and provides an online game through the network, the print method comprising:
a step of acquiring a computer graphics image showing a character of the game and status information related to the character from the server during the online game;
a step of generating a composite image in which a captured image acquired by an imaging unit of the camera-equipped portable terminal and the computer graphics image are composited;
a step of displaying the generated composite image on a display unit of the camera-equipped portable terminal;
a step of acquiring the composite image displayed on the display unit in a case where imaging instruction information is received;
a step of generating a print image including the acquired composite image and information including the status information in a case where print instruction information is received; and
a step of outputting the generated print image to a printer.

21. A non-transitory computer-readable tangible medium comprising computer executable instructions stored thereon, which, when executed by one or more processors, cause the one or more processors to execute a print function applied to a game system that includes a server and a camera-equipped portable terminal communicating with each other through a network and provides an online game through the network, the print function comprising:
a function of acquiring a computer graphics image showing a character of the game and status information related to the character from the server during the online game;
a function of generating a composite image in which a captured image acquired by an imaging unit of the camera-equipped portable terminal and the computer graphics image are composited;
a function of displaying the generated composite image on a display unit of the camera-equipped portable terminal;
a function of acquiring the composite image displayed on the display unit in a case where imaging instruction information is received;
a function of generating a print image including the acquired composite image and information including the status information in a case where print instruction information is received; and
a function of outputting the generated print image to a printer.

22. A print system applied to a game system that includes a server and a camera-equipped portable terminal communicating with each other through a network and provides an online game through the network,
wherein the server includes
a database that manages personal information related to a user of the camera-equipped portable terminal, character identification information specifying a character appearing in the online game, and print identification information related to a photo print in association with each other,
a status information generation unit that generates status information related to the character and including the character identification information,
a server-side communication unit that transmits a computer graphics image showing the character and the status information to the camera-equipped portable terminal during the online game, and
a genuineness determination unit that determines genuineness of the photo print,
the camera-equipped portable terminal includes
an imaging unit,
a terminal-side communication unit that receives the computer graphics image and the status information from the server,
a composite image generation unit that generates a composite image in which the received computer graphics image and the status information are composited,
a display unit that displays the generated composite image,
a composite image acquisition unit that acquires the composite image displayed on the display unit in a case where print instruction information is received,
a print image generation unit that generates a print image including the acquired composite image, the received status information, and the personal information related to the user of the camera-equipped portable terminal and registered in the database,
an output unit that outputs the print image generated by the print image generation unit to a printer, and
a genuineness determination request unit that requests the server to determine the genuineness of the photo print,
the print system comprises the printer that creates the photo print by printing the print image received from the camera-equipped portable terminal on a print medium, the printer printing the print image on the print medium in which the print identification information is printed in a margin region other than a print region,
the genuineness determination request unit causes the imaging unit to image the photo print in a case of requesting the determination of the genuineness of the photo print, acquires the personal information, the character identification information, and the print identification information printed on the photo print, and transmits the acquired personal information, the character identification information, and the print identification information to the server from the terminal-side communication unit,
in a case where the server-side communication unit receives the personal information, the character identification information, and the print identification information from the camera-equipped portable terminal, the genuineness determination unit compares the received personal information, the character identification information, and the print identification information with information registered in the database, determines that the photo print is genuine in a case where matching information is not present to register the received personal information, the character identification information, and the print identification information in the database in association with each other, and determines that the photo print is fake in a case where the matching information is present, and the server-side communication unit transmits a determination result of the genuineness determination unit for the genuineness to the camera-equipped portable terminal.

* * * * *